United States Patent
Ng et al.

(10) Patent No.: US 9,204,415 B2
(45) Date of Patent: Dec. 1, 2015

(54) COMMUNICATION SYSTEM AND APPARATUS FOR STATUS DEPENDENT MOBILE SERVICES

(75) Inventors: Chan Wah Ng, Singapore (SG); Hong Cheng, Singapore (SG); Shinkichi Ikeda, Kanagawa (JP); Takahisa Aoyama, Kanagawa (JP); Jens Bachmann, Oberursel (DE); Sampath Swaroop Kumar, Singapore (SG); Terufumi Takada, Kanagawa (JP); Pek Yew Tan, Singapore (SG)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 667 days.

(21) Appl. No.: 13/504,641

(22) PCT Filed: Oct. 4, 2010

(86) PCT No.: PCT/JP2010/005940
§ 371 (c)(1),
(2), (4) Date: Jun. 26, 2012

(87) PCT Pub. No.: WO2011/052136
PCT Pub. Date: May 5, 2011

(65) Prior Publication Data
US 2012/0264443 A1    Oct. 18, 2012

(30) Foreign Application Priority Data

Oct. 30, 2009  (JP) .................. 2009-250007
Feb. 15, 2010  (JP) .................. 2010-030040
Jun. 15, 2010  (JP) .................. 2010-136475

(51) Int. Cl.
*H04W 72/00* (2009.01)
*H04W 60/04* (2009.01)
*H04W 4/00* (2009.01)
*H04W 68/00* (2009.01)
*H04L 29/08* (2006.01)

(52) U.S. Cl.
CPC .............. *H04W 60/04* (2013.01); *H04W 4/005* (2013.01); *H04L 67/12* (2013.01); *H04W 68/00* (2013.01)

(58) Field of Classification Search
CPC ..... H04L 63/20; H04L 41/0893; H04L 47/14; H04L 47/822; H04L 43/08; H04L 47/20; H04L 47/805; H04L 47/824; H04L 63/10; H04L 47/12; H04L 63/102; H04L 43/0876; H04L 43/0888; H04L 41/0896; H04L 67/2842; H04W 68/00; H04W 68/02; H04W 48/18; H04W 36/14; H04W 4/005; H04W 48/16; H04W 48/20; H04W 52/0206; H04W 52/267; H04W 68/04; H04B 1/7117; H04B 2201/70702; H04B 2201/70703; H04B 2201/70707
USPC .................. 455/450, 434, 435.1, 458, 456.1; 370/228, 252, 331
See application file for complete search history.

(56) References Cited

U.S. PATENT DOCUMENTS

| | | |
|---|---|---|
| 7,356,494 B2 | 4/2008 | Ehrman et al. |
| 2006/0129691 A1 | 6/2006 | Coffee et al. |
| 2007/0005188 A1 | 1/2007 | Johnson |
| 2007/0171850 A1 * | 7/2007 | Feder et al. .................... 370/311 |
| 2008/0162637 A1 | 7/2008 | Adamczyk et al. |
| 2008/0311933 A1 * | 12/2008 | Lim et al. ...................... 455/458 |
| 2009/0232019 A1 | 9/2009 | Gupta et al. |

FOREIGN PATENT DOCUMENTS

| | | |
|---|---|---|
| EP | 1 737 254 A1 | 12/2006 |
| EP | 2 109 327 A1 | 10/2009 |
| EP | 2 587 850 A1 | 5/2013 |
| WO | 02/096128 A2 | 11/2002 |
| WO | 2006/023225 A1 | 3/2006 |
| WO | 2008/079254 A1 | 7/2008 |
| WO | 2009/091743 A2 | 7/2009 |

OTHER PUBLICATIONS

International Search Report for PCT/JP2010/005940 dated Oct. 1, 2011.

3GPP TS 22.368v0.4.0, "Service Requirements for Machine Type Communications", May 2009.
3GPP TS 23.401v9.3.0, "GPRS enhancements for E-UTRAN access", Dec. 2009.
3GPP TS 36.413v9.1.0, "E-UTRA S1 Application Protocol", Dec. 2009.
3GPP TS 36.423v9.1.0, "E-UTRA X2 Application Protocol", Dec. 2009.
3GPP TR 23.888 V0.5.1, "3rd Generation Partnership Project; Technical Specification Group Services and System Aspects; System Improvement for Machine-Type Communications; (Release 10)," Jul. 2010, 75 pages.
3GPP TS 23.201 V9.1.0, "3rd Generation Partnership Project; Technical Specification Group Services and System Aspects; General Packet Radio Service (GPRS) enhancements for Evolved Universal Terrestrial Radio Access Networks (E-UTRAN) access (Release 9)," Jun. 2009, 17 pages.
Alcatel-Lucent, "NIMTC-MME/SGSN overload control by DL MTC traffic throttling," TD S2-102488, 3GPP TSG SA WG2 Meeting #79, Agenda Item: 9.6.1, May 10-14, Kyoto, Japan, 3 pages.
Alcatel-Lucent, "SGSN overload control by throttling of DL low priority traffic," Change Request, S2-103331, 3GPP TSG SA WG2 Meeting #80, Aug. 30-Sep. 3, 2010, Brunstad, Norway, 5 pages.
ZTE, "Clarification on DL MTC traffic throttling," TD S2-103405, 3GPP TSF SA WG2 Meeting #80, Agenda Item: 9.6, Aug. 30-Sep. 3, 2010, Brunstad, Norway, 3 pages.
Extended European Search Report dated Jun. 24, 2015, for corresponding EP Application No. 13185867.2—1854 / 2680619, 11 pages.

* cited by examiner

*Primary Examiner* — Nimesh Patel
(74) *Attorney, Agent, or Firm* — Seed IP Law Group PLLC

(57) ABSTRACT

The present invention introduces system, apparatus and method that reduce wastage of network resources and mobile phone resources. The mobile phone would indicate its status in a tracking area update message when it is connected to the device. The network can then understand from the status indication that the mobile phone is capable of delivering packets to the device, and would thus allow the server to initiate communications. An absence of the status indication would imply the mobile phone is not capable of delivering packets to the device, and the network would then disallow the server to initiate communications.

17 Claims, 21 Drawing Sheets

COMMUNICATION SYSTEM AND APPARATUS FOR STATUS DEPENDENT MOBILE SERVICES

TECHNICAL FIELD

This invention relates to the field of telecommunications in a packet-switched data communications network. More particularly, it concerns the mobile terminal with local connection to other devices.

BACKGROUND ART

The cellular telecommunications has been under constant evolution, from the earlier days of GSM (Global System for Mobile communications) networks, to GPRS (General Packet Radio Service), to the modern system of UMTS (Universal Mobile Telecommunications System) which can be found in various big cities around the world. In the very near future, the next generation Long Term Evolution (LTE) networks are going to be deployed. Along with access technologies, the services provided by the cellular telecommunications network have also been evolving.

Today's cellular network is no longer providing only rudimentary voice call services, but also short text message transmission and access to the global Internet. Recently, new services have even been expanded to cover non-human communications, such as machine-to-machine (M2M) communications. The Third Generation Partnership Project (3GPP) has started defining the requirements for a cellular network to support machine-type communications in [Non-Patent Document 1]. This will make the cellular network even more suitable to support machine-type communications.

Machine-type communications can cover a very wide range of applications, from measurement collection from sensors, to remote control of devices. There are a lot of examples which employ cellular networks. For instance, [Patent Document 1] discloses an asset management architecture utilizing cellular networks to control remote assets, such as automatically-operated vehicles. In [Patent Document 3], a system which uses a regular cellular mobile phone to control an automobile is also described.

The services provided by cellular communications system are also getting more specific. For instance, some services provide location specific information to the user. This will involve the network obtaining the current location of the mobile phone (or user equipment, UE, in 3GPP terminology) using technique such as those disclosed by [Patent Document 2], [Patent Document 4], and [Patent Document 6]. It is also possible for the network to maintain a presence server, such as described in [Patent Document 7]. By exposing the presence information to application servers through methods taught by [Patent Document 5], the application servers can tailor information according to the present location of the mobile phone.

CITATION LIST

Patent Literature

[PTL 1] U.S. Pat. No. 7,356,494 B2 Ehrman et al., "Robust Wireless Communications System Architecture and Asset Management Applications Performed thereof", April 2008.

[PTL 2] US Patent Application US 2008/0162637A1 Adamczyk et al., "Application Services Infrastructure for Next generation Networks including Notification Capability and Related Methods and Computer Program Products", July 2008.

[PTL 3] PCT Patent Application WO 2008/079254A1 Mikan et al., "Wireless Device as Programmable Vehicle Key", July 2008.

[PTL 4] US Patent Application US 2007/0005188A1 Johnson, W., "System and Method for Proactive Content Delivery by Situational Location", January 2007.

[PTL 5] US Patent Application US 2006/0129691A1 Coffee et al., "Location Aware Wireless Data Gateway", June 2006.

[PTL 6] PCT Patent Application WO 2006/023225A1 Julka, V. and Colban, E., "Responsive to Receiving an Event Notification Sent by a MSC, Managing Communication Resources in a Packet Switched Network", March 2006.

[PTL 7] PCT Patent Application WO 2002/096128A2 Kiss et al., "Presence Server in IP Multimedia", November 2002.

Non Patent Literature

[NPL 1] 3GPP TS 22.368v0.4.0, "Service Requirements for Machine Type Communications", May 2009.

[NPL 2] 3GPP TS 23.401v9.3.0, "GPRS enhancements for E-UTRAN access", December 2009.

[NPL 3] 3GPP TS 36.413v9.1.0, "E-UTRA S1 Application Protocol", December 2009.

[NPL 4] 3GPP TS 36.423v9.1.0, "E-UTRA X2 Application Protocol", December 2009.

SUMMARY OF INVENTION

Technical Problem

However, some services may require that the UE constantly moves from idle mode to connected mode, such as requiring the mobile phone to update its location status to additional servers or responding to queries that may not need immediate replies, thereby wasting the mobile phone's battery. Some require the use of Session Initiation Protocol (SIP) for presence signalling, thereby increasing the cost of implementing such solutions. In addition, some services are specific to the status of the mobile phone such that it is meaningless to provide the service to the mobile phone when the mobile phone is not in the required status. This means that UE needs to change its state from idle mode to connected mode in order to inform the status as presence information on the UE to the server. It may cause wastage of the mobile phone's battery.

One example scenario is the use of the mobile phone in an application of smart grid utility, where the power grid provider uses specialized server to communicate with home appliances. This is done not only to collect power consumption statistics by individual home appliances and household, but also to provide power usage profiles and hints to these devices so that power consumption can be optimized based on the demand and supply of the power grid. Since most of such home appliances (eg. air-conditioner, refrigerator) would not have a SIM hosting circuitry built-in, the mobile phone may be employed to use the cellular network as the transport medium for the smart grid M2M application.

With the ubiquity of cellular phone, one can safely assume each household to have at least one subscriber of the cellular network. The home appliances can connect to the subscriber's mobile phone using local network technology such as WiFi or Zigbee, and then make use of the cellular network to communicate with the smart grid utility provider. This has a few advantages. Firstly, there is no need for home appliances to have their own cellular access mechanisms. Secondly, when the subscriber is not at home, the home appliances would either be turned off or in low-power mode anyway, hence there is no real need for the smart grid provider to communicate with the home appliances. The only time when such communications are necessary is when the subscriber is at home—and so would be the phone.

This seems like a win-win arrangement, except that there is one disadvantage: the impact on the battery life of the mobile phone. When the mobile phone is back at home, it can obviously be docked and draw power from the mains, so battery life is of no concern then. However, when the mobile phone leaves the house, it will lose the connection to the home appliances and then will be on battery power. But the smart grid utility provider does not know this. It will continue to contact the mobile phone to collect power consumption statistics information from the home appliances and to send energy usage profiles and hints to the home appliances. This is a waste of the mobile phone battery life since the any such communications attempt is a waste, as the mobile phone is not connected to the home appliance.

Another example scenario is that it may also be possible for servers handling the M2M device to query these M2M devices. There may be different type of such queries. Some queries may need an immediate reply such as current temperature needed. Some may not need an immediate reply such as periodic software update. But the current mechanisms specify that UE is made to reply regardless of the current UE state—idle or connected. Also, the asking entity, either server or other devices have no information of whether the UE is in idle mode or not. Whether the UE is in idle mode or not is known only by the UE and the network node. So what we can imagine happening is that the UE is woken up each time somebody has a query, even when the query doesn't need an immediate response. So, the UE moves back and forth from idle to connected mode thus considerably using up power resources. This is also a case where lack of knowledge of UE's current status results in unnecessary power wastage.

Essentially what we need is some mechanism to prevent the UE from being woken up when it is not important. In the prior art identified, we found some prior art in attacking a similar problem mainly in call screening techniques used to automate the call processing of a callee. In the prior art, the user may register a set of rules for particular phone numbers or IP addresses. The server may use those rules to perform the required task, e.g. block or auto-answer or send to voice mail. After this, the user is notified of the performed action. While, this partly helps in preventing the calls from reaching the user, it lacks the concept of low power requirements needed by the problem identified. For example, the rules would be applied all the time regardless of whether the user's mobile device is in idle mode or not. This is not the intention in terms of saving power. We would only want the server to act when the UE is in idle mode. So, while the prior art is acknowledged, the solution still needs consideration of idle mode requirement which the invention addresses.

Solution to Problem

It is thus an object of the present invention to overcome or at least substantially ameliorate the afore-mentioned disadvantages and shortcomings of the prior art. Specifically, it is an object of the present invention to provide a mechanism so that it is possible for a mobile node to forward packets across multiple anchor points efficiently.

Accordingly, the present invention provides for an apparatus of a mobile node in a cellular communications system, said apparatus having a status indicating means that informs the status of the mobile node to the cellular network, characterised in that the status allows the cellular network to determine if the mobile node is capable of processing data associated with a specific service such that if it is determined that the mobile node is not capable of processing data associated with the specific service, data packets associated with the specific service will not be delivered to the mobile node.

In one preferred embodiment, the status indicating means informs the status of the mobile node by inserting special information into a tracking area update message sent to the cellular network.

In another preferred embodiment, the status indicating means informs the status of the mobile node as being able to process data associated with the specific service by inserting special information into a tracking area update message sent to the cellular network, and informs the status of the mobile node as not being able to process data associated with the specific service by sending a normal tracking area update message without special information sent to the cellular network.

In another preferred embodiment, the special information is information to indicate that the mobile node cannot support the service.

In yet another preferred embodiment, the apparatus further comprises a tracking area update means which sends tracking area update message to the cellular network when the status of the mobile node being able to process data associated with the specific service is changed.

In a still another preferred embodiment, the status indicating means informs the status of the mobile node by registering with the cellular network the location information of a single or plurality of locations where the mobile node is able to process data associated with the specific service, such that when the location of the mobile node known to the cellular network is not within any of the registered location information, data packets associated with the specific service will not be delivered.

In a further preferred embodiment, the registration of location information is carried out by inserting the location information in the traffic flow template associated with the communications bearer the cellular network maintains for the mobile node, such that a data packet will only be delivered to the mobile node by the cellular network if the parameters of the data packet matches the corresponding parameters contained in the traffic flow template, and if the location of the mobile node known to the cellular network matches the location information inserted into the traffic flow template.

In a yet further preferred embodiment, the apparatus further comprises a location updating means which will request a base station the mobile node is currently attached to report a location with added information to the cellular network when the mobile node is in a location which matches the location information registered with the cellular network but the mobile node is currently unable to process data associated with the specific service, characterized in that the added information to the reported location will result in the cellular network treating the mobile node as not in a location that matches the registered location information such that data packets associated with the specific service will not be delivered to the mobile node.

In a still further preferred embodiment, the status indicating means will modify the traffic flow template such that the a data packet associated with the specific service will not be delivered by the cellular network even when the mobile node is in a location which matches the location information registered with the cellular network, when the mobile node is currently unable to process data associated with the specific service.

In yet another preferred embodiment, the status indicating means informs the status of the mobile node as being not able to process data associated with the specific service in a service request message sent to the cellular network in response to a paging request sent by the cellular network, characterized in that the paging request is for data packet associated with the specific service, and the service request has special indication such that active communications bearer between the mobile node and the cellular network will not be established.

In another preferred embodiment, the apparatus is arranged to configure a service-related restriction list, such that the network would only deliver corresponding service data traffic to the location in the restriction list.

In another preferred embodiment, the network pages the mobile node only on cells in the restriction list.

In another preferred embodiment, the apparatus is arranged to signal the status using RRC layer message.

In another preferred embodiment, the network focuses on M2M activity aware IP packet processing and info updating. The M2M application can be designed in such a way that it is possible to identify particular IP address or port number or a combination of IP address and port number to be used as either a white list or a black list. White list means that these "filters" must be passed through by incoming packets. Black lists mean that these filters must not be through by incoming packets. For simplicity, this invention focuses on white lists. Now, the M2M application server typically does not have access to core network elements. So, after p2p exchange of this filter information, it is the UE application that prepares this list. The application provides this list to lower layer control stacks such as NAS (non-access stratum) in 3GPP architecture. Then the NAS provides this information to the core network and provides indications that these filters are to be applied only when the UE is in idle mode. The NAS may also indicate to the core network that the network store the packet info of the packets that don't pass through the filters. Then the network is to provide them to the UE only when the UE connects again to the network due to other reasons.

The above method ensures two things. First, the network doesn't needlessly stop unimportant packets when the M2M device already is in connected mode. If the device is connected, it might as well receive and respond to any queries it may receive. The decision to perform filtering is based on the indication provided by the M2M device. Secondly, when the filtering is done and some packets are blocked, the network makes sure that it doesn't immediately inform the M2M device of the missed packets as informing the M2M device would negate the whole purpose. The network continues to filter and add to the list of blocked or Disallowed packets until the M2M device makes a connection again to the core network. Using this opportunity of having the M2M device in connected mode, the network sends the list of Disallowed packets to the M2M device. Once the M2M device receives the list of Disallowed packets, the application in the M2M device may use this information to query the particular IP address and make sure it can get information of the reason it was contacted and proceed there onwards based on the particular upper layer protocol.

In another preferred embodiment, the invention proposes a QoS check mechanism of the uplink data at the UE while the UE is in idle mode. The QoS check involves checking whether the data has real time requirements or not. Real time here can be used in various meanings: example the media is based on a multimedia call initiation, or the UE needs to send an urgent message, etc. Based on the necessity of real time requirement, the status indicating means inform the network of real time requirement, and may provide information of which bearer contexts the data relates to. The network, based on its current resources, uses the information in the status to make a decision whether to allow the connection to be setup or not.

Advantageous Effects of Invention

The invention has the advantage of reducing waste of network resources and mobile phone resources.

DESCRIPTION OF EMBODIMENTS

In the following description, for purposes of explanation, specific numbers, times, structures, protocol names, and other parameters are set forth in order to provide a thorough understanding of the present invention. However, it will be apparent to anyone skilled in the art that the presented invention may be practiced without these specific details.

EXAMPLE 1

Principle of Invention

The present invention applies to the situation where a user equipment (UE), which is also referred to as mobile node, informs its status to the wide area network, e.g. the cellular network, such that the status allows the wide area network to determine if the user equipment is capable of processing data associated with a specific service. If it is determined that the user equipment is not capable of processing data associated with the specific service, data packets associated with the specific service will not be delivered to the user equipment. The following preferred embodiments of the present invention will give exemplary applications of the present invention.

{Apparatus}

Figure 1:
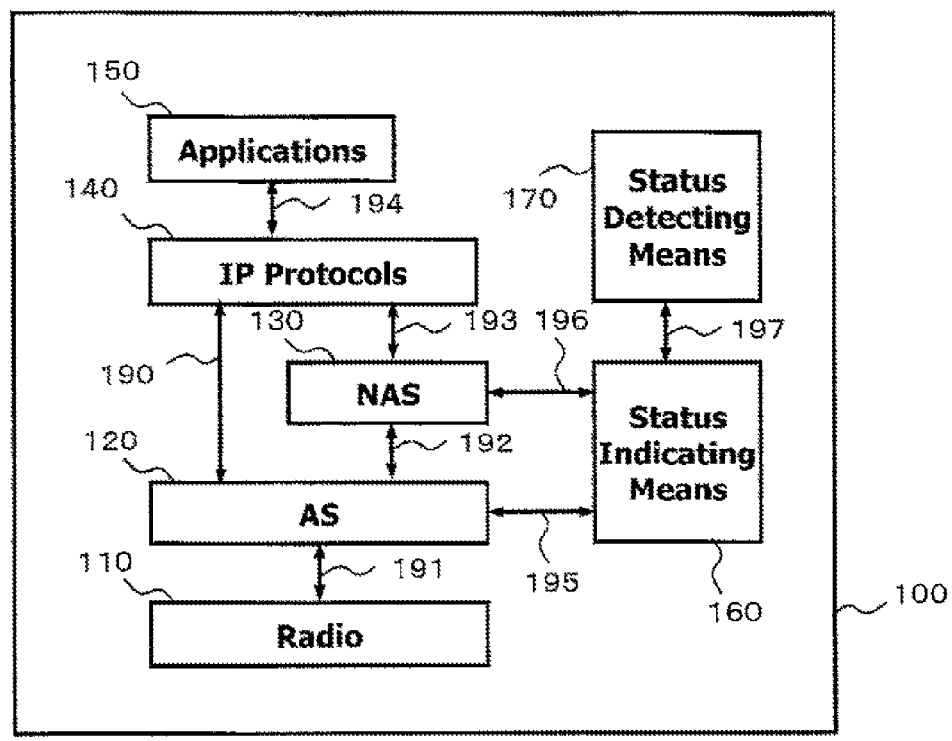
FIG. 1 shows a preferred functional architecture of the user equipment according to a preferred embodiment of the present invention.

FIG. 1 depicts the preferred functional architecture 100 of a UE, comprising of a Radio block 110, an Access Stratum (AS) block 120, a Non-Access Stratum (NAS) 130, an IP Protocols block 140, an Applications block 150, a Status Indicating means 160 and a Status Detecting means 170.

Radio 110 is a functional block comprises of the hardware and firmware necessary to enable a UE to communicate with the cellular base station. It may include the antenna, transmitting circuitry and receiving circuitry. It is obvious to anyone skilled in the art that this does not preclude the system to be used in a wired environment, i.e. the Radio 110 function can be replaced with wired transmission means as long as interface 191 is kept intact. It is also possible that the Radio 110 is in fact running on top of another layer of communication stack, e.g. the Unlicensed Mobile Access (UMA) or any variance of the Generic Access Network (GAN).

Access Stratum (AS) 120 is functional block that implements the radio access control and signalling to the cellular radio network, and the transport of information over the Radio 110 access. The signal path 191 allows data and control signals to be sent or received between the AS 120 and Radio 110.

Non-Access Stratum (NAS) 130 is functional block that implements the control plane signalling and initiation of user plane transport of data between the UE and the cellular network. The signal path 192 allows the NAS 130 and AS 120 to exchange control information and signalling messages.

IP Protocols 140 is a functional block comprises of the software that implements the internet protocols in order for the UE to communicate with other nodes on the global internet, across the cellular network. The path 190 allows data packets to be transferred between IP Protocols 140 and AS 120 for transmission and reception. The path 193 allows control signals to be passed between IP Protocols 140 and NAS 130.

Applications 150 is a functional block comprises of the software and program that may be running on the UE that needs to communicate with other entities. For example, Applications 130 may include voice-over-IP programs to allow the user to perform voice calls with the UE, and web browser to allow the user to browse the World Wide Web with the UE. The data path 194 allows data packets to be passed between Applications 150 and IP Protocols 140.

The above functional blocks typically exist in all UEs. The present invention introduces the Status Detecting means 170 and Status Indicating means 160. The Status Detecting means 170 detects the current status of the UE, and informs the Status Indicating means 160 via the signal path 197 when a change in the status of the UE is detected. The Status Indicating means 160 may inform the cellular network of the status change by sending AS control messages via the signal path 195, or by sending NAS control messages via the signal path 196.

It is also possible for the NAS block 130 to obtain the status to be indicated from the Status Indicating means 160 via the signal path 196 whenever the NAS block 130 needs to send a control message including the status of the UE to the network. Similarly, it is possible for the AS block 120 to obtain the status to be indicated from the Status Indicating means 160 via the signal path 195 whenever the AS block 120 needs to send a control message including the status of the UE to the network. It is also possible for the Status Indicating Means 160 to obtain information to generate the status information from NAS 130 and/or AS 120 via signal path 196 and 195 respectively.

{Example Application: Smart Grid}

Figure 2:
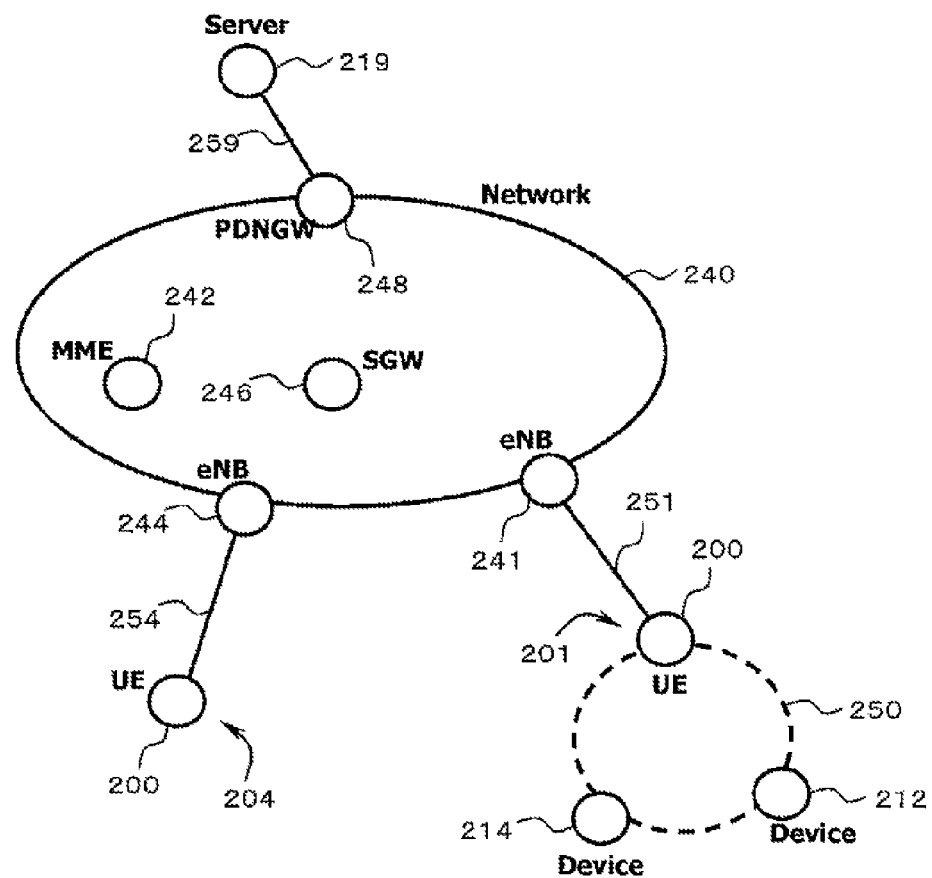
FIG. 2 shows a deployment wherein a server communicating with devices through the cellular network with the help of a user equipment.

In order for the present invention to be easily comprehended, the present embodiment will explain the invention using an exemplary application scenario as illustrated in FIG. 2. FIG. 2 shows a communications session between the devices 212 and 214 and the server 219 over the cellular network 240. This can be, as an illustration, a machine-to-machine communications for the smart grid utility application, where the server 219 is located at the smart grid provider, and devices 212 and 214 are home appliances located in a user's residence. The server 219 communicates with devices 212 and 214 via the cellular network 240 and mobile phone UE 200 when the devices 212 and 214 are connected to UE 200 via the local area network 250. The local area network 250 may include, but not limited to, IEEE802.11 WiFi, Zigbee or powerline communications.

A typically cellular network 240 will comprise of various cellular base stations eNB 241 and eNB 244, a mobility management entity MME 242, a serving gateway SGW 246, and a packet data network gateway PDNGW 248. The base stations eNB 241 and eNB 244 each provides cellular radio access to the mobile phones in their respective coverage area. For example, when UE 200 is in the position 201, it gains access to the network 240 by attaching to eNB 241 via connection 251. When UE 200 is in the position 204, it gains access to the network 240 by attaching to eNB 244 via connection 254.

The MME 242 manages the mobility of UEs attached to the cellular network. SGW 246 is the anchor point for the UE among a group of base stations. Under the instruction of MME 242, appropriate bearers between SGW 246 and the base station the HE is currently connected to will be established. The PDNGW 248 is the gateway between the cellular network and other packet-switched network (such as the global Internet). When a data packet is received by PDNGW 248 for a UE, the PDNGW 248 will route the packet to the serving gateway SGW 246. SGW 246 then forwards the packet to the UE via the bearer established with the base station.

Using the example of a machine-to-machine communications for the smart grid utility application, any data communications initiated by server 219 will only be useful if the UE 200 is currently in position 201 where it is connected to devices 212 and/or 214. Should the UE 200 be in position 204, communications initiated by the server 219 will only cause the UE 200 to be paged and woke up from power-saving idle mode to establish active communications with its serving gateway SGW 246 only to receive data from server 219 that cannot be delivered to devices 212/214. This wastes the resources of both the cellular network and user equipment.

{Tracking Area Update Containing New IE for Status}

One preferred embodiment of the present invention prevents such wastage from happening by allowing the UE 200 to indicate its status to the cellular network. Such a status may indicate to the network whether the UE is currently capable of processing data associated with a particular service (e.g. whether the UE 200 is connected to devices 212/214 so that smart grid application service can be delivered).

Figure 3:
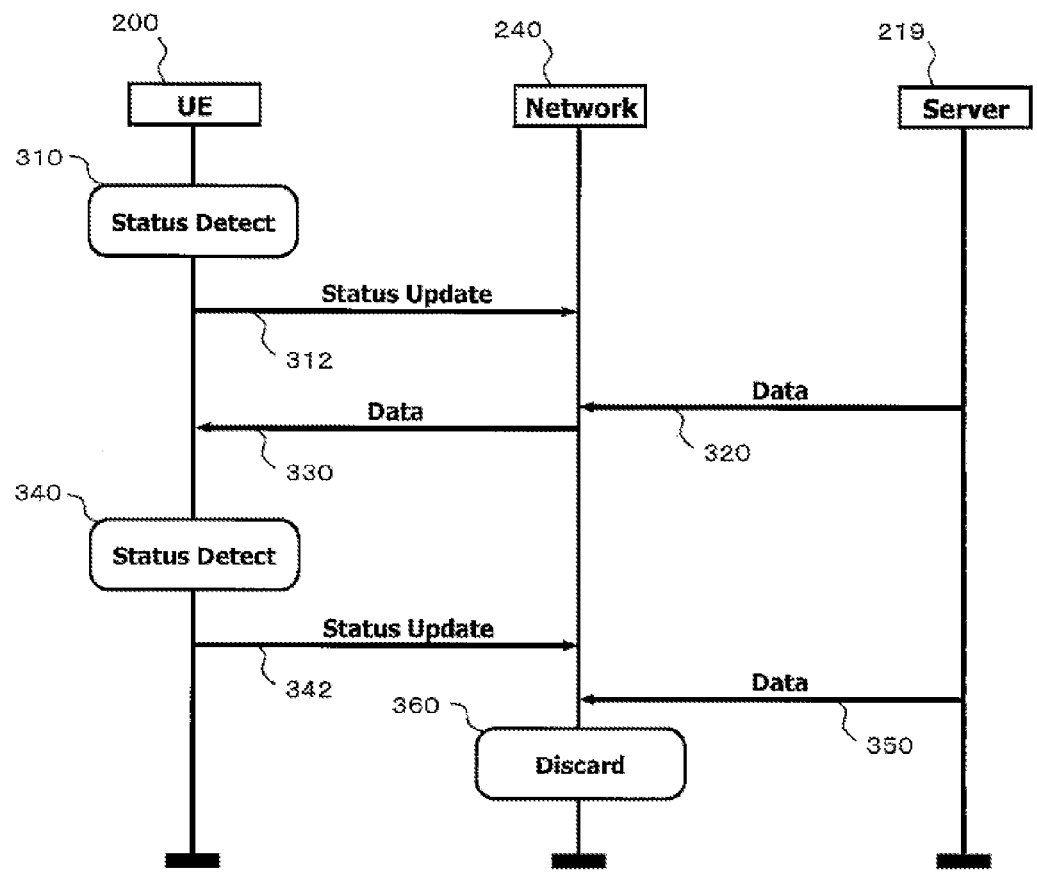
FIG. 3 shows a message sequence diagram of the user equipment according to a preferred embodiment indicating its status to the cellular network.

If the status indicates that the UE is currently capable of processing data associated with said service (e.g. UE 200 is connected to devices 212/214), then the network can enable the initiation of said service, and contact the UE when said service is initiated (e.g. when server 219 sends a smart grid application message). If the status indicates that the UE is currently incapable of processing data associated with said service (e.g. UE 200 is not connected to devices 212/214), then the network should disable the initiation of said service, and should not contact the UE when said service is initiated. FIG. 3 illustrates this with a generalized message sequence diagram.

In FIG. 3, the status detecting means of UE 200 first determines the current status of the UE (e.g. whether UE 200 is currently connected to devices 212/214) as illustrated by the process block 310. Assuming the status detected is positive (e.g. UE 200 is connected to devices 212/214), the status indicating means of UE 200 will send a status update message 312 to the network 240, to indicate that UE 200 is capable of processing the said service. Hence when server 219 sends a data 320 to UE 200 (e.g. for delivery to device 212), the network 240 forwards the data 330 to UE 200 or page for UE 200 to establish active connection (not shown in FIG. 3) if the UE is in IDLE mode.

After some time, the status detecting means of UE 200 detects that the status of UE has changed, as illustrated by the process block 340, where the UE has lost connection to the devices 212 and 214. This can be due to a few reasons, including, but not limited to, UE 200 having moved to position 204 (i.e. handed-over from the cell where the UE has connection to the devices 212 and 214 to other cell in connected mode, or just moved from the coverage area of the cell where the UE has connection to the devices 212 and 214 to the coverage area of other cell in idle mode), the devices 212 and 214 have moved out of connection range from the UE, or the devices 212 and 214 have been powered off.

The status indicating means of UE 200, under above described condition, will send a status update message 342 to the network 240, to indicate that UE 200 is not capable of processing the said service. Hence when server 219 sends a data 350 to UE 200 (e.g. for delivery to device 212), the network 240 will discard the data as shown by the process block 360.

It should be obvious to one skilled in the art that with the procedure described in the current embodiment, unnecessary waking up of the UE for delivery of services that UE is incapable of processing will be reduced. Hence, according to this preferred embodiment, the objective of the present invention is achieved.

{PDNGW Approach}

The illustration and explanation above is made in a conceptual way so that the present invention can be easily understood. In the following preferred embodiments, two different approaches of implementing what is described in FIG. 3 will be disclosed.

Figure 4:
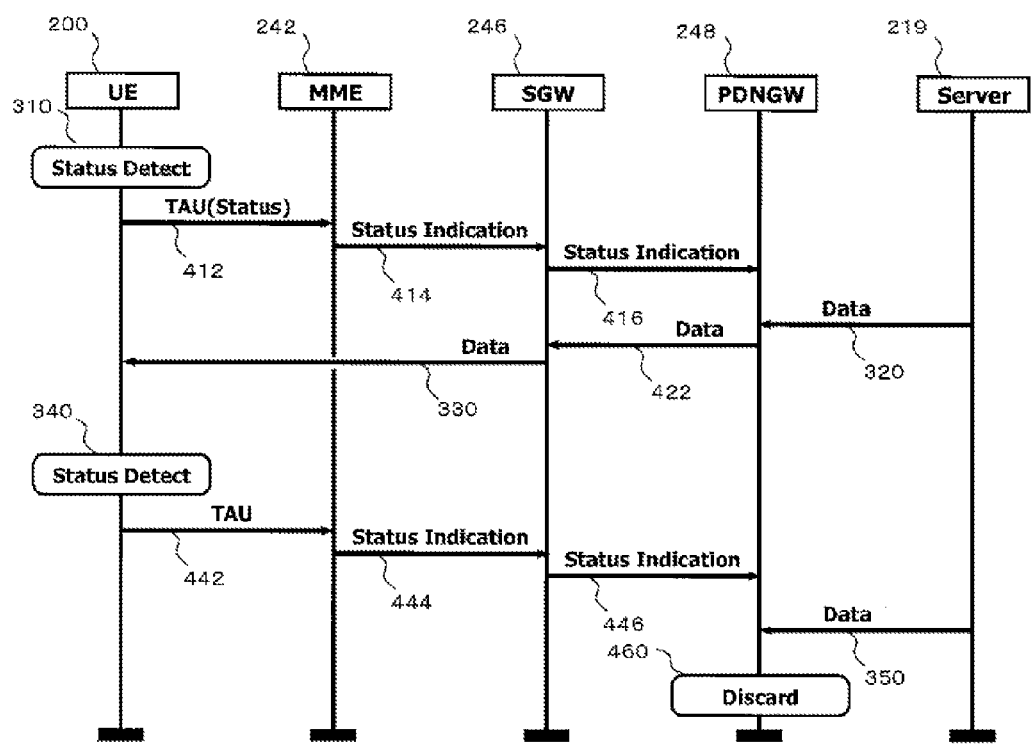
FIG. 4 shows a message sequence diagram of the cellular network gateway allowing or disallowing a service to be provided to the user equipment according to a preferred embodiment.
Figure 5:
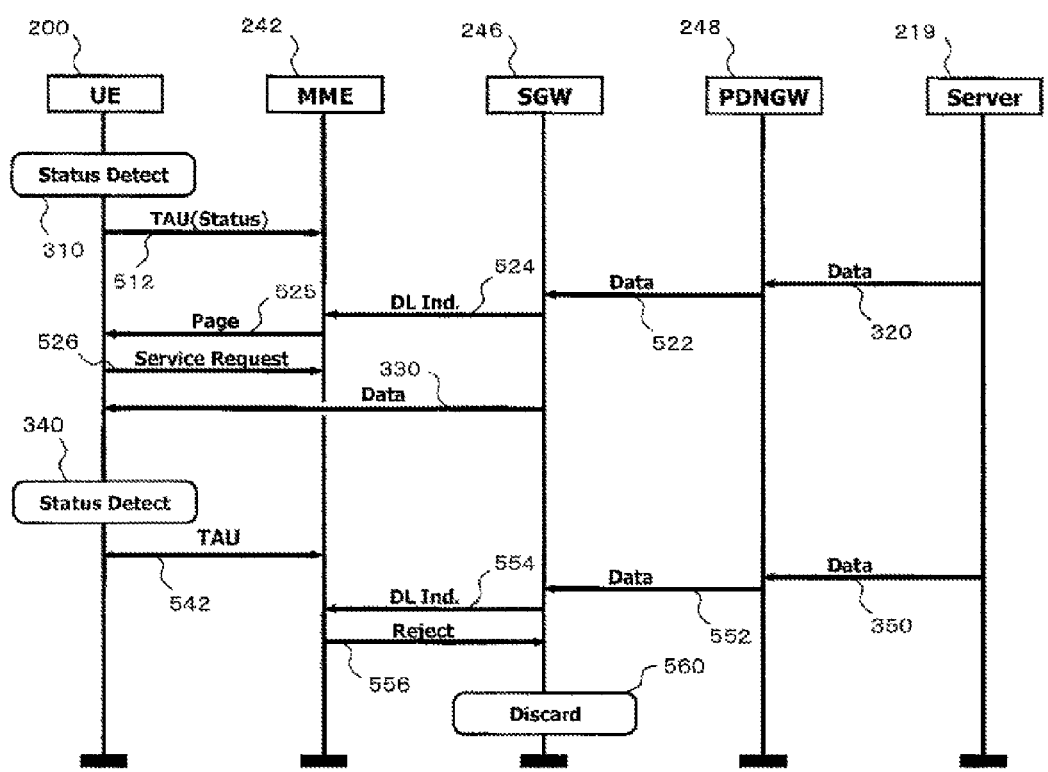
FIG. 5 shows a message sequence diagram of the cellular network mobility management entity allowing or disallowing a service to be provided to the user equipment according to a preferred embodiment.

First approach is depicted in FIG. 4 where the PDNGW will be informed of the status of the UE and discard packets for specific services if the status of UE indicates that the UE is currently incapable of processing the said specific services. Second approach is depicted in FIG. 5 where the MME will be informed of the status of the UE and will not activate any bearers for specific services if the status of UE indicates that the UE is currently incapable of processing the said specific services.

In FIG. 4, the status detecting means of UE 200 first determines the current status of the UE (e.g. whether UE 200 is currently connected to devices 212/214) as illustrated by the process block 310. Assuming the status detected is positive (e.g. UE 200 is connected to devices 212/214), the status indicating means of UE 200 will insert a status information element into a tracking area update (TAU) message 412. The status information element will indicate that UE 200 is capable of processing data associated with the said service.

Tracking area update message is an existing 3GPP NAS message containing a group of information elements which the UE sends to inform the MME the current base station it is attached to. This allows the MME to keep track of the area the UE is in and page only a selected group of base stations when there is downlink data for the UE. The present embodiment inserts a new information element which indicates the status of UE. When the MME 242 sees this new information element in the TAU message 412, it will send the status indication to the SGW 246 in message 414.

The SGW 246 will then pass this status indication to the PDNGW 248 in message 416. It should be obvious to a person skilled in the art that the MME can send the status indication message directly to the PDNGW. The reason why the SGW is involved in the example of FIG. 3 is because there is currently no direct communications between MME and PDNGW defined in 3GPP architecture. It should also be obvious to a person skilled in the art that the status indication can be of any form: as a new message or as a new information element inserted in an existing message.

Now that the PDNGW 248 knows the status of UE 200, when server 219 sends a data 320 to UE 200 (e.g. for delivery to device 212), the PDNGW 248 will allows the data to be forwarded to SGW 246 as shown by message 422. The network and forward the data 330 to UE 200, or page for UE 200 to establish active connection (not shown in FIG. 4), if the SGW 246 has no active bearer towards the UE 200, e.g. when UE is in IDLE mode.

Assuming that after some time, the status detecting means of UE 200 detects that the status of UE has changed, as illustrated by the process block 340 where the UE has lost connection to the devices 212 and 214. This can be due to a few reasons, including, but not limited to, UE 200 having moved to position 204 (i.e. handed-over from the cell where the UE has connection to the devices 212 and 214 to other cell in connected mode or just moved from the coverage area of the cell where the UE has connection to the devices 212 and 214 to the coverage area of other cell in idle mode), the devices 212 and 214 have moved out of connection range from the UE, or the devices 212 and 214 have been powered off.

The status indicating means of UE 200, under above described condition, will then sends a new TAU message 442 even when the tracking area has not changed but the cell id has changed. This TAU message will not contain the new information element. Thus the MME 242 can interpret it as the UE is no longer capable of processing data associated with the said service. A person skilled in the art would appreciate that a status information element to indicate that UE 200 is not capable of processing data associated with the said service can also be inserted to TAU message 442 to achieve the same effect.

After receiving TAU message 442, MME 242 will send the status indication to the SGW 246 in message 444. The SGW 246 will then pass this status indication to the PDNGW 248 in message 446. When server 219 sends a data 350 to UE 200 (e.g. for delivery to device 212), PDNGW 248 will know that UE 200 is currently unable to process the data, and will thus discard the data as shown by the process block 460.

In the same way, when the status detecting means detects that the status of UE has changed, e.g. UE 200 has moved back to the position 250 where the UE gets connection to devices 212 and 214 (for example, due to the UE being handed-over to the cell where the UE has connection to the devices 212 and 214 from other cell in connected mode or just moved into the coverage area of the cell where the UE has connection to the devices 212 and 214 from other cell in idle mode, the devices 212 and 214 have moved back within connection range from the UE, or the devices 212 and 214 are powered up and a connection with UE has been established), the status indicating means of UE 200, under above described condition, will then sends a new TAU message 412 even when the tracking area has not changed but the cell id has changed. This TAU message will contain the new information element. Thus the MME 242 can interpret it as the UE is again capable of processing data associated with the said service.

The PDNGW 248 may control QoS resources for the connection based on the UE status. For example, when the UE 200 moves out the registered location, the PDNGW 248 may reduce, suspend or temporarily delete (but the context may be kept) QoS resources for the PDN connection or the bearers for the service since the service is not capable until the UE 200 comes back to one of registered locations. Then, when the UE 200 move back to one of the registered locations, the PDNGW 248 may increase, resume or (re-)establish the QoS resources for the service since the service gets available for the UE 200.

It should be obvious to one skilled in the art that with the procedure described in the current embodiment, unnecessary waking up of the UE for delivery of services that UE is incapable of processing will be reduced. Hence, according to this preferred embodiment, the objective of the present invention is achieved.

{MME Approach}

In FIG. 5, the approach where the MME will be informed of the status of the UE and will not activate any bearers for specific services if the status of UE indicates that the UE is currently incapable of processing data associated with the said specific services is illustrated.

Initially, the status detecting means of UE 200 determines the current status of the UE (e.g. whether UE 200 is currently connected to devices 212/214) as illustrated by the process block 310. Assuming the status detected is positive (e.g. UE 200 is connected to devices 212/214), the status indicating means of UE 200 will insert a status information element into a TAU message 512. The status information element will indicate that UE 200 is capable of processing the said service.

So now MME 242 knows the status of UE 200. Suppose server 219 now sends the data message 320 (e.g. data for delivery to device 212). When PDNGW 248 receives this packet, it will forward the data packet to SGW 246, as shown by message 522. If there is no active bearer for UE 200, SGW 246 will send a downlink data indication 524 to MME 242. This will request MME 242 to set up the active bearer. The downlink data indication will also contain the type of service associated with this downlink data, so that MME can check against the current status of UE 200.

In this case, UE 200 has indicated in TAU message 512 that it is capable of processing data associated with the service (e.g. UE 200 is connected to devices 212/214). Hence, MME 242 will proceed to page for the UE, as shown by the paging message 525. UE 200 will then wake up from IDLE or other power-saving mode, and send the service request message 526. Upon receiving this service request message 526, MME 242 will know which base station the UE is currently attached to. Hence, the active bearer can be established between the base station and SGW 246. The data packet 330 can then be sent to UE 200.

Assuming that after some time, the status detecting means of UE 200 detects that the status of UE has changed, as illustrated by the process block 340 where the UE has lost connection to the devices 212 and 214. This can be due to a few reasons, including, but not limited to, UE 200 has moved to position 204 (i.e. handed-over from the cell where the UE has connection to the devices 212 and 214 to other cell in connected mode or just moved from the coverage area of the cell where the UE has connection to the devices 212 and 214 to the coverage area of other cell in idle mode), the devices 212 and 214 have moved out of connection range from the UE, or the devices 212 and 214 have been powered off. The status indicating means of UE 200, under above described condition, will then sends a new TAU message 542 even when the tracking area has not changed but the cell id has changed.

This TAU message will not contain the new information element, and thus the MME 242 can interpret it as the UE is no longer capable of processing data associated with the said service. Suppose now server 219 sends a data packet 350 (e.g. data for delivery to device 212). When PDNGW 248 receives this packet, it will forward the data packet to SGW 246, as shown by message 552. Since there is no active bearer for UE 200, SGW 246 will send a downlink data indication 554 to MME 242.

This will request MME 242 to set up the active bearer. The downlink data indication will also contain the type or information for MME to identify the type of service associated with this downlink data, so that MME can check against the current status of UE 200. In this case, UE 200 has indicated in TAU message 542 that it is not capable of processing data associated with the service (e.g. UE 200 is not connected to devices 212/214). Hence, MME 242 will reject this downlink request, and will not page for the UE. The SGW 246 thus discards the data, as shown by the process block 560.

In the same way, when the status detecting means detects that the status of UE has changed, e.g. UE 200 has moved back to the position 250 where the UE gets connection to devices 212 and 214 (for example, due to the UE being handed-over to the cell where the UE has connection to the devices 212 and 214 from other cell in connected mode or just moved into the coverage area of the cell where the UE has connection to the devices 212 and 214 from other cell in idle mode), the devices 212 and 214 have moved back within connection range from the UE, or the devices 212 and 214 are powered up and a connection with the UE has been established), the status indicating means of UE 200, under above described condition, will then sends a new TAU message 512 even when the tracking area has not changed but the cell id has changed. This TAU message will contain the new information element. Thus the MME 242 can interpret it as the UE is again capable of processing data associated with the said service.

It should be obvious to one skilled in the art that with the procedure described in the current embodiment, unnecessary waking up of the UE for delivery of services that. UE is incapable of processing will be reduced. Hence, according to this preferred embodiment, the objective of the present invention is achieved.

The signalling sequence illustrated in FIG. 5 assumes the status information is a positive indication, i.e. used when UE 200 wants to indicate that the service is supported. It is obvious to anyone skilled in the art that the invention can have an alternative that works with negative indication, i.e. the UE 200 uses a normal TAU to indicate that the service is supported, and uses a TAU with negative status information to indicate that the services should be rejected. The signalling sequence illustrated in FIG. 5 is still applicable, with only message 512 replaced with normal TAU, i.e. with the Status indication, and message 542 replaced with a special TAU that includes a Status indicating the service is not supported. With this negative indication alternative, legacy UE operation would not be affected, i.e. the MME would always initiate the paging 525 as normal.

It is obvious to anyone skilled in the art that the above mentioned status information can also be associated with a time component. For example, the status information can also indicate the validity of the status, e.g. from Oct. 1, 2009, 2 pm to Oct. 1, 2009, 4 pm, etc. This way, the signalling for the status update could be further reduced. The network nodes, e.g. MME or PDNGW, can automatically alter the UE status based on the indicated time, without explicit signalling from UE. Using this method, the UE 200 can also do some pre-signalling for the status indication, when it has the best opportunity for signalling.

The status information may be associated with information of user who uses the UE on the service or type of the UE (communication terminal). For example, the status information can also indicate user information such as user id, user name, credit card number, token id, pass-code, or terminal information such as IMEI (International Mobile Equipment Identifier), and the status information is available only when the user or the terminal is authenticated and/or authorized by network, e.g. an entity in the PDN. Authentication and/or authorization can be performed only with the information included in the status information, or with additional procedures for specific authentication and/or authorization. The PDNGW obtains the result of authentication/authorization and makes the status information available when the authentication/authorization was successfully done, otherwise unavailable, such that the status information can be utilized according to the actual user of the UE and/or the service, or the terminal type.

{Flowchart for UE}

Figure 6:
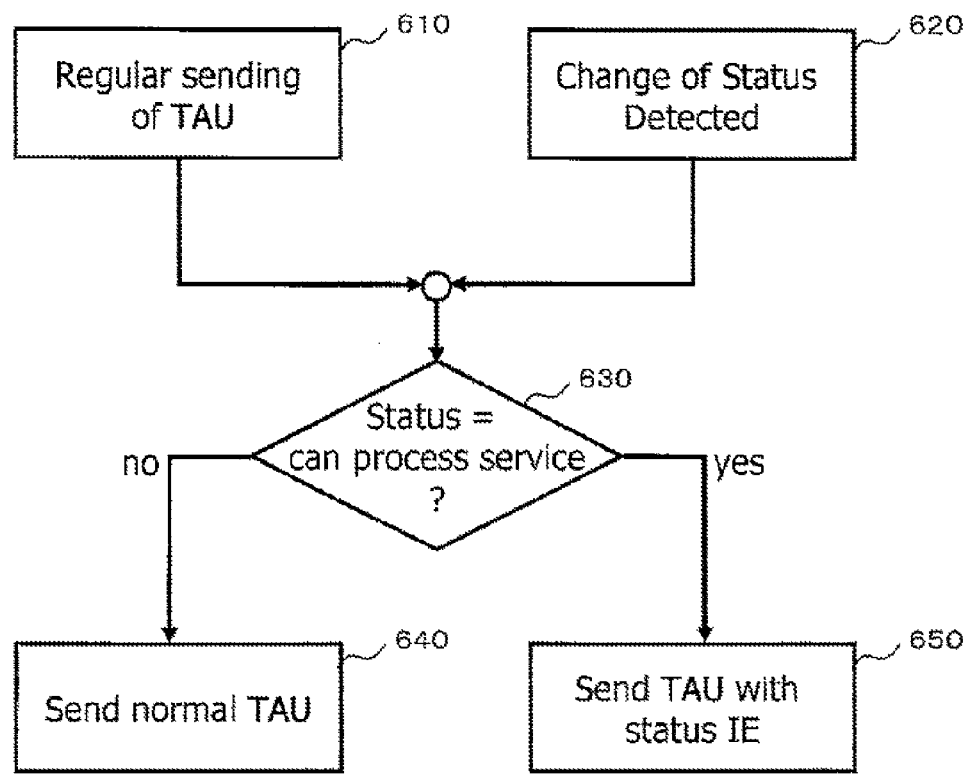
FIG. 6 shows the flowchart on the sending of tracking area update by a user equipment according to a preferred embodiment of the present invention.

For the above two approaches depicted respectively in FIG. 4 and FIG. 5, one could recognize that they differ only in the network node where the status of the UE is used to decide whether to enable or disable communications for a particular service. For the first approach described in FIG. 4, it is the PDNGW making the decision. For the second approach described in FIG. 5, it is the MME. In both approaches, the behavior of the UE remains the same. FIG. 6 illustrates the flowchart depicting the behavior of the UE.

Firstly, there are two processes 610 and 620 that will trigger the sending of a TAU message. For process 610, it is the normal 3GPP conditions such as entering a cell with a tracking area code that is not in the tracking area list of the UE or when periodic timer for sending TAU messages expires, etc. For process 620, it is when the status detecting means of the UE detects a change in the status of UE.

In both cases, when UE decides that a TAU message is to be sent, the status detecting means will then check if the status of the UE implies the UE is capable of processing data associated with the service as shown in the decision step 630. If the status implies the UE cannot process the service, process block 640 will be triggered where a normal TAU message will be sent. On the other hand, if the status implies the UE can process data associated with the service, process block 650 will be triggered where a TAU message with the status information element will be sent.

It is obvious to anyone skilled in the art that the above logic can be also adopted for the negative indication alternative. In that case, at step 630, when the status of the UE is negative, i.e. service is not supported, step 650 will be executed to generate a TAU with the negative Status indication. If the status of UE is positive, i.e. service is supported, a normal TAU is generated, as in step 640. With this alternative logic, a legacy UE would not execute step 620 and 630 and therefore would always generate the normal TAU, as in step 640.

{UE Still Get Paged}

In the approaches illustrated in FIGS. 3, 4 and 5, the UE indicates its status to the network so that decision on whether a service should be allowed based on the status of the UE can be made. In the approaches illustrated in FIGS. 7 and 8, the location of the UE is used to derive whether a service should be allowed. The objective of all these approaches is to reduce unnecessary signaling for a service when the UE is not capable of processing the service. Even though such objective is generally achieved, there are situations where signaling for a service may still take place when the UE is incapable of processing the service.

For example, the UE may not have sent a tracking area update message to update status or location of the UE. This may be because the UE is still in the same tracking area. Another possibility is that the UE is still in the same cell, but is no longer capable to process data associated with a service (e.g. the UE 200 is at home, but not connected to devices 212/214). One simple solution is obviously for the UE to always send a tracking area update message to indicate a change in status whenever the status of the UE changes. However, this requires the UE to spend battery power for such transmission.

Another approach is for the UE to get paged for the service. When the UE wakes up, and go into connected mode, it can then inform the network that its status has change, so that the network will no longer page for the UE for subsequent service initiation. This may be done by sending a tracking area update once the UE is in connected mode, or for the UE to use the Bearer Resource Modify message to modify the traffic flow template so that subsequent data packets associated with the service will be filtered away by the PDNGW.

Additionally, the page request sent to UE may contain special indication that the page is due to data packets from a particular service. The special indication may include for example a priority indicator, which indicates that the network would not accept any bearer setup if the priority is lower than it. When the UE sees this special indication, and is not capable of processing data associated with the said service, it can send a special service request in response to the page request. This special service request will let the network knows that the UE is not capable of processing the service, and thus no bearer will be activated. The UE will immediately go back to power-save mode after sending the special service request. Alternatively, the UE may skip the sending of service request and stay in the power-save mode after receiving the paging, e.g. if the data or signaling messages to be sent have lower than indicated priority.

{Presence API}

To further reduce unnecessary resource consumption, the network can provide a presence application programming interface (API) to the servers so that the server can be informed through the presence API whether the UE is currently capable of processing data associated with the service. Such an API may be implemented as a form of web applications, a Remote Procedure Call (RPC), or a Really Simple Syndication (RSS) feed. In this way the server can determine whether to initiate communications to the UE.

An alternative for such an API will be for the PDNGW to responds with an error code when the PDNGW receives a data packet from the server while the UE is incapable of processing data associated with the service. Such an error code would let the server knows why its packet fails to get through, and the server can suppress further attempts to retry for a reasonably long period of time.

Although the invention has been herein shown and described in what is conceived to be the most practical and preferred embodiment, it will be appreciated by those skilled in the art that various modifications may be made in details of design and parameters without departing from the scope and ambit of the invention.

EXAMPLE 2

Legacy MME: TFT Contain Location

One other characteristics of the above two approaches depicted in FIG. 4 and FIG. 5 is that they require changes to multiple network entities, such as the MME and the PDNGWs. For reasons of backward compatibility, hardware costs or otherwise, network operators would generally like to keep the changes required on the network nodes to a minimum. Additionally, since a user equipment can be assigned the same PDNGW no matter where the user equipment is, whereas the assignment of MME is generally based on the base station the user equipment is currently attached to, it would be more desirable to change only the PDNGW.

Basic assumptions and concepts are same as embodiment 1. The only speciality in this embodiment (i.e. difference from last embodiment) is that the MME is not modified due to implementation costs etc. as described above, thus other parts of assumptions, concepts and configurations can be used as well in this embodiment.

This preferred embodiment discloses a mode of operation of the present invention where new functionality is only required at the PDNGW. In essence, the UE will register a single or plurality of cells (e.g. such as the ECGI—EUTRAN Cell Global Identifier) where the UE is capable of processing the service with the PDNGW. For instance, in the example application of smart grid machine communications, the UE is connected to the home appliances only when it is at home. Hence, the UE can register the cell that covers the home with the PDNGW. By registering the cell(s) where the UE can process data associated with the service, whenever the said service is initiated, the PDNGW can check the current location of the UE against the registered cells, and decide whether the service initiation should be allowed. This is depicted in FIG. 7.

Figure 7:
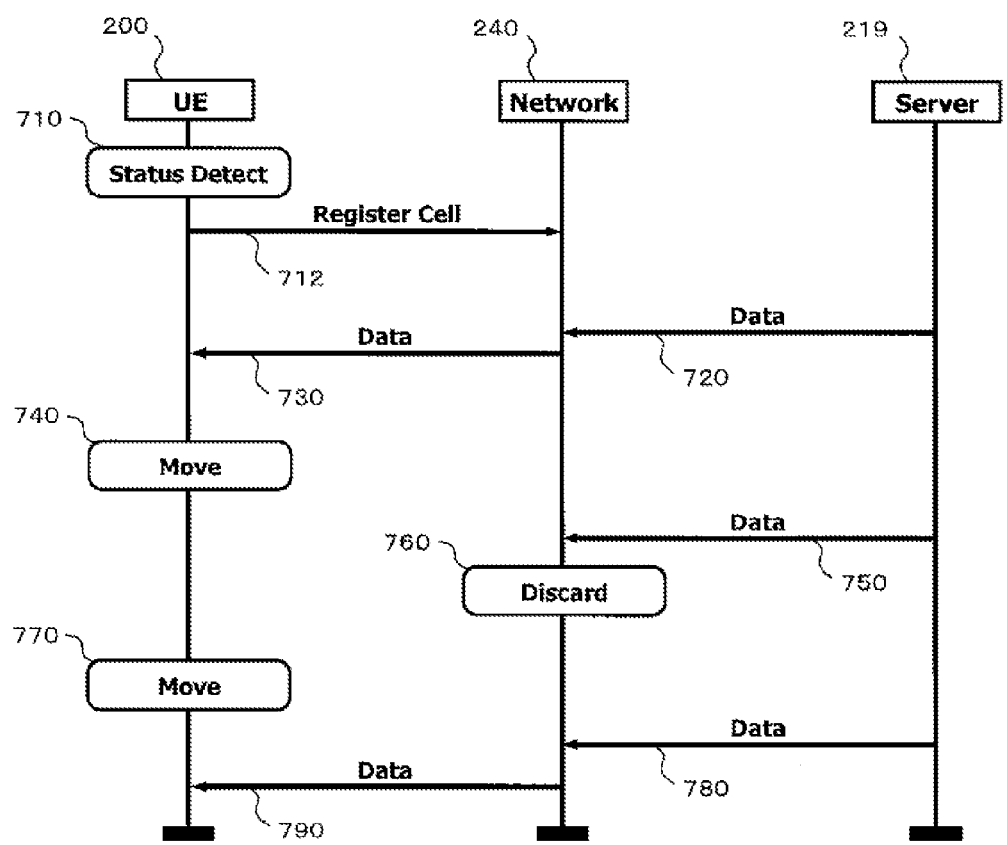
FIG. 7 shows a message sequence diagram of a user equipment registering the location where service should be enabled according to a preferred embodiment of the present invention.

In FIG. 7, the status detection means would detect the status of the UE 200 as shown in process block 710. When a positive status is detected (e.g. the UE 200 is connected to devices 212 or 214), the status indication means will obtain from AS layer the ECGI of the current cell. If the ECGI is not registered with the network 240, the status indication means will trigger the transmission of a Register Cell message 712 to the network 240. The Register Cell message 712 will register the ECGI of the current cell with the network. Subsequently, when the server 219 sends a data 720 to UE 200 (e.g. for delivery to device 212), the network 240 will check the current location of the UE against the registered cells. If the current location matches one of the registered cells, the network 240 will page for UE 200 to establish active connection (not shown in FIG. 7), and forwards the data 730 to UE 200.

Suppose after some time the UE moves to other cells (as indicated by process block 740), then it would cause handover procedure from the registered cell to any of unregistered cells and/or TAU procedure initiated by the UE even when the tracking area has not changed but only the cell has changed after the UE movement, and finally the network 240 will obtain the location information of the UE, i.e. a new ECGI, through the handover or TAU procedure. When the server 219 sends a data 750 to UE 200 (e.g. for delivery to device 212), the network 240 will check the current location of the UE against the registered cells and find that the current location does not match any of the registered cells. The network 240 will thus discard the data packet as indicated by the process block 760.

Suppose again after some time the UE moves to another cell that has been previously registered (as indicated by process block 770), then it would cause handover procedure from any of unregistered cells to the registered cell and/or TAU procedure initiated by the UE even when the tracking area has not changed but only the cell has changed after the UE movement, and finally the network 240 will obtain the location information of the UE, i.e. the registered ECGI, through the handover or TAU procedure. When the server 219 sends a data 780 to UE 200 (e.g. for delivery to device 212), the network 240 will check the current location of the UE against the registered cells and find that the current location matches one of the registered cells. The network 240 will thus page for UE 200 to establish active connection (not shown in FIG. 7), and forwards the data 790 to UE 200.

It should be obvious to one skilled in the art that with the procedure described in the current embodiment, unnecessary waking up of the UE for delivery of services that UE is incapable of processing will be reduced. Additionally, no additional signalling by the UE regarding its status is needed except for the initial registration of cells, further saving battery power. Hence, according to this preferred embodiment, the objective of the present invention is achieved.

The illustration and explanation above is made in a conceptual way so that the present invention can be easily understood. In the following preferred embodiment, a specific implementation of the method described in FIG. 7 will be illustrated, with the aid of FIG. 8.

Figure 8:
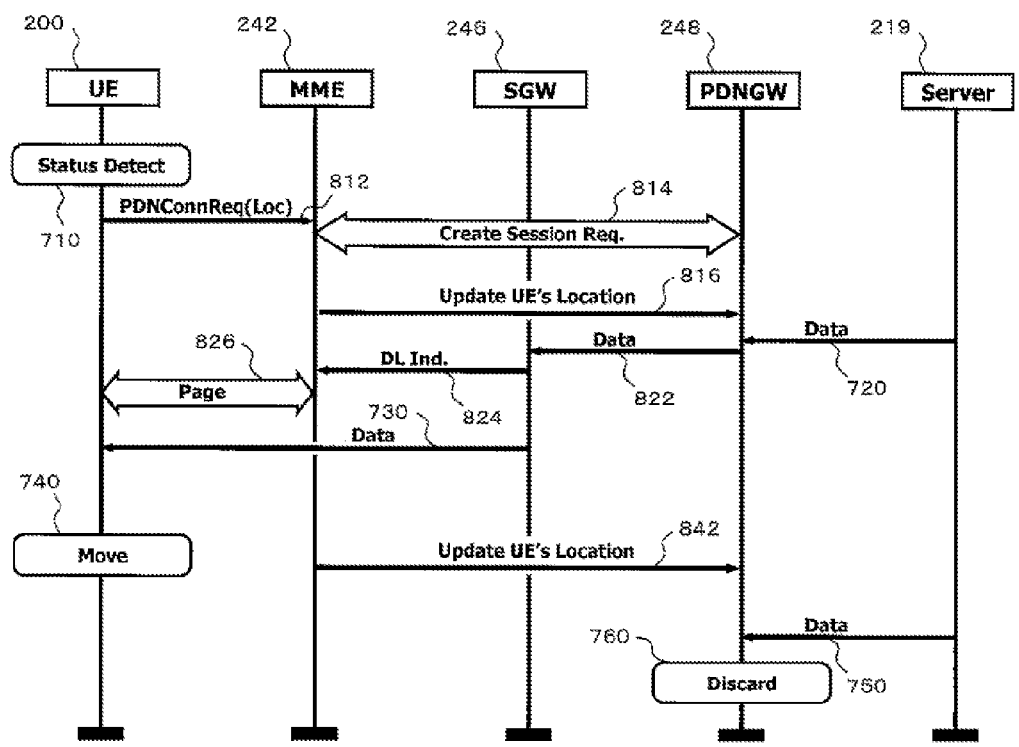
FIG. 8 shows a message sequence diagram of a user equipment registering the location where service should be enabled according to a preferred embodiment of the present invention.

In FIG. 8, the status detection means would detect the status of the UE 200 as shown in process block 710. When a positive status is detected (e.g. the UE 200 is connected to devices 212 or 214), the status indication means will obtain from AS layer the ECGI of the current cell. If the ECGI is not registered with the network 240, the status indication means will trigger a registration of the cell. In this example, UE 200 will send a PDN Connectivity Request message 812. The PDN Connectivity Request message 812 will contain a Protocol Configuration Option (PCO) to carry the cell identity to be registered. In existing 3GPP mechanism, the PDN Connectivity Request message is used when the UE is establishing a new PDN connection.

Hence, for this example, the UE is registering the cell at the same time when it is establishing a PDN connection for the service (e.g. a machine-to-machine PDN connection). A person skilled in the art would appreciate that this is a sensible approach, since different PDN connections will be established for different purposes. It is normal for the UE to establish the PDN connection for a service at the first time it is capable of processing. A person skilled in the art would also recognize that other messages can be used. For example, upon completing the PDN Connectivity Request process, the UE will send a PDN Connectivity Complete message.

The cell identifier to be registered can be inserted as part of a traffic flow template (TFT) that is sent in the PDN Connectivity Complete message to be associated with this PDN connection. And, when the UE subsequently wants to modify or add the cells registered, it can use a Request Bearer Resource Modification message to update the traffic flow template associated with the PDN connection.

When the MME 242 receives the PDN Connectivity Request message 812, it will initiate the Create Session Request/Response procedure 814 with the PDNGW 248 via the SGW 246. Any PCO contained in the PDN Connectivity Request message 812 will be transparently passed to PDNGW 248 in this Create Session procedure 814. When the PDNGW 848 notices the cell registration PCO, it will know that the UE is attempting to associate the specified with the service tied to the PDN connection.

Hence, the PDNGW 248 can indicate to MME 242 during the Create Session procedure 814 for location updates of the UE 200. This means that subsequently, whenever the UE's location changes, the MME 242 will update the PDNGW 248, such as shown by the Update UE's Location messages 816 and 842, e.g. as part of the Modify Bearer Request message sent from the MME 242 to the SGW 246 and relayed to the PDNGW 248.

Now, when the server 219 sends a data 720 to UE 200 (e.g. for delivery to device 212), the PDNGW 248 will check the current location of the UE against the registered cells. If the current location matches one of the registered cells, the PDNGW 248 will forward the packet to the SGW 246, as shown by message 822. If there is no active bearer for UE 200, SGW 246 will send a downlink data indication 824 to MME 242. This will request MME 242 to set up the active bearer. MME 242 will proceed to page for the UE and the UE 200 will then wake up from IDLE or other power-saving mode, and send the service request message. This will establish the active bearer and is showed in FIG. 8 as the paging process 826 (the bearer activations are not shown in the diagram). The data packet 730 can then be sent to UE 200.

Assuming that after some time, UE 200 has moved, as indicated by the process block 740. When the MME 242 detects such a movement, it will update PDNGW 248 of the UE's current location by message 842. How the MME 842 knows that UE 200 has moved can be through various means. For example, the UE 200 may have sent a tracking area update message. Suppose in this case the UE 200 has moved to a cell where it has not registered with the PDNGW and has sent a tracking area update message even though the tracking area hasn't changed but only the cell has changed, to which the tracking area update message eNB adds its cell id, e.g. ECGI.

The PDNGW 248 will then receive the ECGI as UE's location information via MME and know that the UE is currently not capable of processing the service since the informed cell id is not matched with any of UE's registered cells. Thus, when the server 219 sends a data packet 750 (e.g. data for delivery to device 212), the PDNGW 248 will discard the packet as indicated by process block 760.

The ECGI (or ECGI list) as the location information, in which location the service is capable, may be registered in the user subscription or service rule. In such case, the PDNGW 248 will obtain the location information from the user subscription registered in the HSS or from the QoS/Charging policy/rule provided by the PCRF, and set them into the TFT as a default rule or most strict (highly prioritized) rule. The PDNGW 248 may obtain other information associated with the location information, e.g. ID of service capable in the location, packet filter information to be set with the location information, etc. Such information may be provided by a service server in the PDN to the PCRF, online/offline charging server or HSS.

It should be obvious to one skilled in the art that with the procedure described in the current embodiment, unnecessary waking up of the UE for delivery of services that UE is incapable of processing will be reduced. Hence, according to this preferred embodiment, the objective of the present invention is achieved.

{Multiple Sets}

The above preferred embodiments were described with the UE enabling the communications between one set of devices and server (i.e. devices 212/214 in location 201 and server 219). It is possible for the UE to enable communications involving different sets of devices in different locations. The use of traffic flow template to register the locations where the service should be enabled lends itself well to cater for the case where there are different sets of devices in different locations. This is because multiple traffic flow templates can be associated with a single PDN connection. Hence, the UE can use different traffic flow templates for different sets of devices.

As an example, consider that at location L1, the UE will enable communications between devices D1A and D1B and server S1; at location L2, the UE will enable communications between devices D2A, D2B and D2C and server S2. The UE can then install two sets of traffic flow templates. The first traffic flow template will contain description of the IP session between server S1 and devices D1A, D1B, such as the source and destination IP addresses. It will also contain the new location field to be matched, which is the location L1.

The second traffic flow template will contain description of the IP session between server S2 and devices D2A, D2B, D2C such as the source and destination IP addresses. It will also contain the new location field to be matched, which is the location L2. In this way, when the UE is in location L1, packets from server S1 will be allowed through since the traffic flow template parameters {source IP=S1; Location=L1} will be fully matched. However, the packets from server S2 will be blocked by the PDNGW, since the parameters {source IP=S2; Location=L1} does not match any of the installed traffic flow templates. Similarly, when the UE is in location L2, packets from server S2 will be allowed through since the traffic flow template parameters {source IP=S2; Location=L2} will be fully matched. However, the packets from server S1 will be blocked by the PDNGW, since the parameters {source IP=S1; Location=L2} does not match any of the installed traffic flow templates.

For the case where the UE registers the location with the network (i.e. described in FIGS. 7 and 8), it implies that there is a direct correlation between the location of the UE and the UE's ability to process data associated with a particular service. In many applications, such a correlation exists, eg. UE providing transport for machine-type communications between fixed local devices and remote servers. This is especially true when the base station cell coverage is small.

For instance, femtocell base stations (or sometimes know as Home eNodeB) to be placed in residence typically only have coverage of a few tens of meters in radius, just enough to cover a typical residence. However, when the cell coverage area is big, such a correlation will be smaller. The UE may have moved far away from the fixed local devices such that it can no longer communicate with them but is still within the coverage area of the same cell. In such situation, the PDNGW will see that the UE is in a registered cell and allow the service to pass through.

One way to resolve this is for the UE to go into connected mode and modify the traffic flow template so that services will be filtered away. When the UE is again capable of processing data associated with the service, it will restore the original traffic flow template.

Another way to resolve this is for there to be a separate PDN connection for machine-type communications. The UE will tear down the PDN connection for the machine-type communications when it is incapable of processing data associated with services for machine-type communications, and establish the PDN connection when it is capable.

Yet another way to resolve this is for the UE, even within the same cell, i.e. where any handover or TAU is not normally required, to send a tracking area update (TAU) message that will cause the network to think that the UE is in a different location such that the service data packets will not match the location field in the traffic flow template (and would thus not be delivered). This can be done by the UE adding a "salt" flag in the TAU message, so that the MME will recognize that the UE is trying to show a different location, and hence would update the PDNGW with a slightly different location (e.g. the ECGI of the current cell with extra bits inserted—this is sometimes known as "salting").

However, this requires modification to the MME functionality. Another possibility is for the UE to ask the eNodeB to "salt" the reported ECGI. In 3GPP defined procedures, the actual location (i.e. the ECGI of the current cell) is inserted into the TAU message, a message carrying the TAU message to the MME or any UE specific signaling message by the eNodeB, not the UE. Hence, the UE can add a special radio layer flag in the TAU message, so that the eNodeB will insert a "salted" ECGI into the TAU message or the message carrying the TAU message instead of the original ECGI. In this way, the MME will report the ECGI and the salting as the location of the UE to the PDNGW, and thus will not match the location field in the traffic flow template.

It should be obvious to one skilled in the art that the location information can be not only cell related information like ECGI or TAI but also network wise information like access network identifier, PLMN ID, etc. Hence, the service would be widely deployed then user benefit would be increased.

EXAMPLE 3

Alternative: Service/Bearer Based Paging Optimization

In certain cases, the service area of the UE 200 can be pre-determined, e.g. by the subscription, pre-registered area, history data, user input, etc. For example, when a UE provides the service at a specific location, it can generate a kind of fingerprint using the cell information and GPS, etc.

Figure 9:
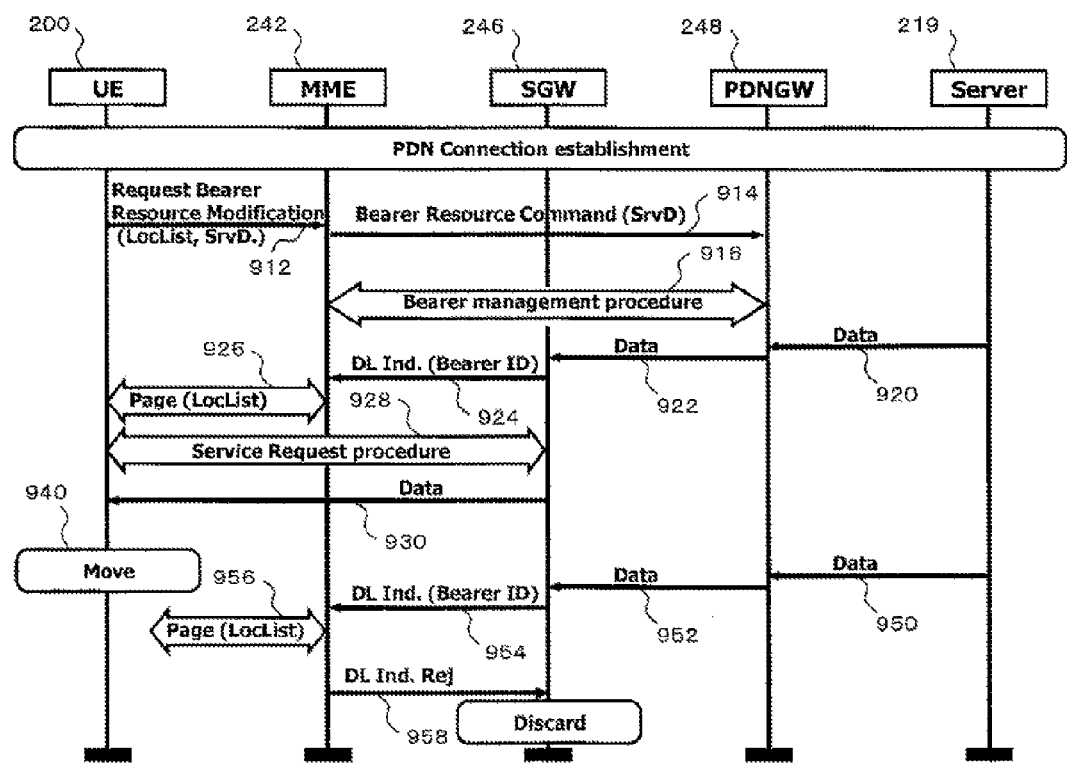
FIG. 9 shows a message sequence diagram of a user equipment making use of the bearer management procedure for the optimization of the paging associated with a specific service/bearer.

In such case, the UE 200 can configure the network to make use of the information to avoid unnecessarily paging the UE 200 when it is in IDLE or other power saving mode. For this purpose, the UE 200 can make use of the UE requested bearer resource modification procedure to configure the network. FIG. 9 illustrated an example signaling sequence of the operation.

After the corresponding PDN connection establishment, e.g. the Attach Procedure or the UE Requested PDN Connectivity establishment, the UE 200 sends a Request Bearer Resource Modification 912 toward the MME 242. The Request Bearer Resource Modification 912 message contains the service coverage information, e.g. the Location List that the service is available in the form of ECGI list or TAI list, the service description with either APN or TFT, etc.

After receiving the Request Bearer Resource Modification, the MME stores the service coverage information, and sends a Bearer Resource Command 914 to the PDNGW 248 via the SGW 246. In the Bearer Resource Command, the service description is included.

The PDNGW 248 would initiate the Bearer management procedure 916 to create or modify the corresponding bearer for the service. The PDNGW 248 makes use of the information in the Bearer Resource Command 914 and the embedded Service description to decide whether a new bearer should be created or an old bearer should be modified. When downlink data corresponds to the service received, it would be forwarded by the PDNGW 248 to the SGW 246. When no active bearer exists for the UE 200, e.g. UE is in IDLE mode, a Downlink data indication 924 is signaled to the MME 242 with the corresponding Bearer ID.

In case that there are data from multiple bearers arriving at the SGW 246, the Downlink data indication 924 may carry a list of all the Bearer IDs. Alternatively, the SGW 246 can send multiple Downlink data indication 924 to the MME 242, each time data from a different bearer arrives. If the MME 242 prefers to limit the Downlink data notification, it can send a Delay Downlink Packet Notification Request with priority information, e.g. QCI, ARP, etc. Only if the data arrives on bearer with higher priority than the indicated, the SGW 246 would send a new Downlink Packet Notification to the MME 242.

The MME 242 retrieves the service coverage information associated with the bearer it received in 912, and issues the paging to the cells allowed by the service coverage information. Alternatively, the MME 242 can issue the paging message that carries the service coverage information or certain priority information, e.g. the location list, ARP, QCI, etc, and only those cells listed in the service coverage information or meets the priority will broadcast out the paging message. For example, a eNB or RNC after receiving such a paging message would based on local status, e.g. cell congestion, cell location, local policies, etc, to decide if the paging message should be sent out.

If the UE 200 is camped in one of the cells allowed by the service coverage and/or priority information, it would receive the Paging message 926, and thus initiate the Service Request procedure 928 to active the bearers. Data will then be forwarded to the UE 200 by the SGW 246, as in 930. If in case the UE 200 has moved to a cell not in the service coverage information before receiving the paging, as in 940, the paging will fail. After certain time, the MME 242 will indicate a Downlink Data Indication Rejection 958 to the SGW 246. This will cause the SGW 246 to discard the buffered packets for this bearer.

It is obvious to anyone skilled in the art that if the service coverage information is available to the PDNGW 248 via other means, e.g. service related policy, application layer via Policy Control and Charging framework, it can perform a PDNGW 248 initiated bearer management and configure the MME 242 with such information. For example, PDNGW 248 can execute the procedure 916 without UE 200 initiated triggering.

It is obvious to anyone skilled in the art that the service coverage information may also include or be replaced by a time constrain component. For example, the UE 200 can based on subscription, user preference/settings, or heuristic algorithm, decide a time period that the specific service should be allowed or blocked. This time period information can be included in the service coverage information as an additional element, and signaled using previously mentioned method to the network, e.g. MME or PDNGW. The network nodes, e.g. MME or PDNGW, will make use of the time period information besides the other service coverage information in deciding if a service flow should be forwarded to the UE. In certain situation, the service coverage information may only contain the time related information, e.g. there is no other constrain for the service.

It is also obvious to anyone skilled in the art that the UE 200 can perform an update of the service coverage information at anytime during the lifetime of the service by perform the signaling as in 912 to 916.

{Use of RRC for the Status Signaling}

In the previous embodiments, the signaling of the service support status is carried out in the NAS layer. In another alternative, the same goal could be achieved by signaling using the Radio Resource Control layer if such function is supported by the access network. For example, the UE can indicate the status in the Measurement Report message that would be transmitted from UE to the Access Network from time to time, e.g. the eNodeB. This can trigger the eNodeB to initiate some bearer modification, e.g. a special Bearer Release Request, to indicate to the MME that data packets for the specific service should be blocked. MME can then signal to the SGW and PDNGW to drop the packets related to the service. This would be useful when UE is in Connect Mode but using Discontinuous Reception (DRX).

EXAMPLE 4

For certain services, the service area or location may be strictly limited by the service provider or customer. For example, a corporate service may be provided only within a specific location as inside the corporate building or the site. In such a case, the network operator or the service provider may stop to provide the service to the UE if it is out of coverage for the subscribed service. Furthermore, the UE may be not allowed to connect to any cell out of the corporate area, but the company may want to track movement of the UE for its management.

In another example case, the UE 200 may be a communication device with the limited purpose to collect charging related data on an equipment, e.g. a communication device embedded in a vending machine. Here, the operator would prohibit usage of the USIM inside another device, for example, it would be prohibited to insert the USIM into a normal UE and perform an attachment to the operator's network. The operator network would reject the attachment or assign only limited resources, to avoid user data communication of the UE but to be able to track its movement.

Furthermore, the UE 200 or an equipment in which the UE 200 is embedded are located in a pre-determined location and it may not be allowed or expected that the UE moves away from the location during a specific period or forever. For example, a vending machine is only placed at a fixed location and it can't be moved. Some sensing devices such as monitoring cameras are also bound to a fixed place, e.g. on a wall. Another case may be a high-definition television at a shopping mall, which provides advertisements of the shops and other valuable information to customers that is also bound to the wall during a specific period.

For such cases, it can be detected as theft or as removal and use of USIM in another UE or embedded device when the UE 200 moves and/or attaches to the network from another area (e.g. cell, tracking area, etc) outside of the pre-determined location. If the system detects the movement of the UE 200 that is not allowed or expected to move, the operator of the system may want to disconnect or keep the connection with limited resources in order to capture the thief after tracking the UE 200.

In [NPL 2], there are two types of handover procedures, S1 based handover and X2 based handover.

In S1 based handover case, which is also described in [NPL 3], according to the previous embodiment, the UE 200 already provided information about its registered cells to the network, i.e. MME or PGW (even in case of PGW, because the TFT is provided to the MME and stored in the UE's MM context, it is obvious for the MME to know about the registered cells for the UE), the MME will detect movement of the UE 200 out of the registered cell to any unregistered cell. The MME may simply detect the movement of the UE 200 to a restricted cell, to which the UE is not allowed attach or handover, based on the restriction information contained in the user subscription provided from the system database, e.g. HSS (Home Subscriber Server) or AAA (Authentication, Authorization and Accounting) server.

Therefore, in this case the MME may perform specific measures to avoid unauthorized resource consumption. One example is that the MME rejects (or ignores) the handover required message from the source eNB during the handover procedure and simply disconnects (or releases) the connection of the UE 200 after rejection. Another example is that the MME accepts the handover required message and let the handover procedure complete successfully, but the MME may trigger the target eNB or other network nodes (e.g. SGW, PGW, etc), to block all uplink data, e.g. to avoid user data activity of the thief. In a further example, the MME may modify (or newly configure) parameters of the resources, e.g. QoS, UE context including bearer information, etc, to limit or not assign resources at the target cell (i.e. target eNB) for the UE 200. in this case the MME may send a handover request message to the target eNB during the handover procedure including the modified (or newly configured) parameters. The MME may for example only trigger establishment of the default bearer but omit any dedicated bearers.

Similar to S1 based handover case, when the UE 200 is in idle mode and moves from a registered cell to any unregistered cell, the MME will detect movement of the UE 200 out of the registered cell to the unregistered cell because the UE 200 will perform the Tracking Area Update procedure to notify its new location, i.e. the new cell the UE 200 is camped on, to the MME as described in the previous embodiment. Thus, the MME can reject the Tracking Area Update request from the UE 200 or simply disconnect the connection of the UE 200. After or during the rejection of the Tracking Area Update request from the UE 200, the MME may request the target eNB to assign limited resources for the UE 200 when receiving a service request message or attach request message from the UE 200 later.

However, in case of X2 based handover, which is also described in [NPL 4], the MME is not able to prevent or limit the resources for the UE 200 at the target eNB before the UE is connected to the target eNB, because the MME detects the UE's movement only after the handover of the UE when the target eNB sends the path switch request to the MME. Thus, the UE 200 in the hands of the thief may successfully handover to the target cell and may utilize the connection for uplink and downlink data.

In order to avoid such abuse by the thief or limit the service provided to the UE 200 out of the service area, i.e. registered cell, even when X2 based handover is applied, the MME provides information about the registered cells or restriction information, e.g. the identifier of the restricted cells (e.g. ECGI), for the UE 200 to the current, i.e. allowed eNB. The restriction information may also contain further information, e.g. restricted PLMN ID, restricted Tracking Area ID, etc. A White Cell List (i.e. list of allowed cells, e.g. registered cells) or a Black Cell List (i.e. list of restricted cells, e.g. unregistered cells or other cells than registered cells) may be part of the Handover restriction list sent from the MME to the eNB defined in [NPL 3]). Such restriction based on the White Cell List, Black Cell List or Handover restriction list may be applied per UE, EPS bearer, PDP context, Radio Bearer (RB) based on the location of the UE 200.

The source eNB configures the White Cell List or Black Cell List for the UE 200 based on the provided information in order to avoid handover or limit resources allocated during the handover, e.g. to configure the White Cell List with the registered cell IDs, or the Black Cell List with the unregistered or restricted cell IDs. If the source eNB detects (e.g. based on measurement reports sent by the UE) that the UE 200 is trying to move out from the registered cell to any unregistered cell or to any restricted cell, i.e. to a cell other than in the White Cell List or to a cell in the Black Cell List, the source eNB either rejects (i.e. does not trigger handover) and optionally reports to the MME, or the source eNB requests only limited or reduced resources (including parameters of the resources) in the handover request message to the target cell.

The MME may maintain the services provisioned per bearer (e.g. EPS bearer, PDP context, RB) or PDN connection. In case the MME is involved during the handover, the MME may either request resource limitation or reduction at the target cell per bearer or PDN connection, reject handover per bearer or PDN connection, ignore the handover decision per bearer or PDN connection, or perform release of bearer or PDN connection. In case that the MME provides the White Cell List and/or Black Cell List to the source eNB, the White Cell List and/or Black Cell List may contain the target EPS bearer(s), PDP context(s) or RB(s) for the action described above according to the location of the UE 200.

It is obvious to anyone skilled in the art that the MME or the eNB(s) may already know (e.g. by configuration, etc) if either S1-based or X2-based handover will be applied in their respective areas or to which combination of source and target eNBs. In such case, the MME will provide the restriction information, information on registered/unregistered cells for the UE 200, White Cell List and/or Black Cell List to the eNB(s) only when X2-based handover is applied to the access network under coverage of the MME. Such information may be conveyed from the MME to the eNB using either Path Switch Request Ack message when X2-based handover is successfully completed, or Handover Request message when S1-based handover is performed, or Initial Context Setup Request message when the UE 200 is attaching or moving from idle mode to connected mode, or Bearer Setup Request message when a new PDN connection or a new dedicated bearer is being established. In case the eNB has no or outdated restriction information stored for a UE, it may request the MME to provide the restriction information before the handover of the UE 200 to a target eNB which supports X2 interface with the source eNB is performed.

{eNB Apparatus}

Figure 10:
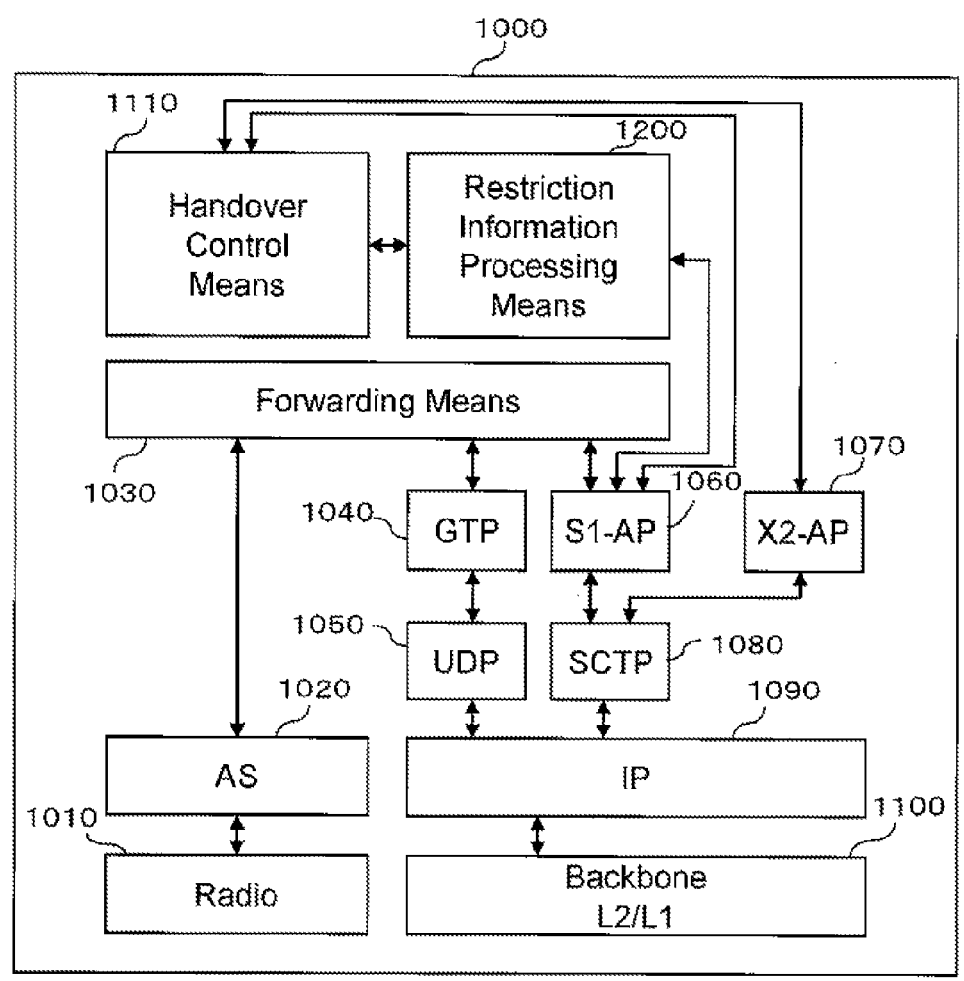
FIG. 10 shows a preferred functional architecture of a eNB according to a preferred embodiment of the present invention.

FIG. 10 depicts the preferred functional architecture 1000 of a eNB, comprising of a Radio block 1010, an Access Stratum (AS) block 1020, a Forwarding means 1030, a GPRS Tunneling Protocol (GTP) block 1040, an UDP block 1050, a S1-AP block 1060, a X2-AP block 1070, a SCTP block 1080, an IP Protocols block 1090, a Backbone L2/L1 block 1100, a handover control means 1110, a restriction information processing means 1200.

Radio 1010 is a functional block comprises of the hardware and firmware necessary to enable an eNB to communicate with the UE(s). It may include the antenna, transmitting circuitry and receiving circuitry. It is obvious to anyone skilled in the art that this does not preclude the system to be used in a wired environment, i.e. the Radio 110 function can be replaced with wired transmission means as long as interface with the AS 1020 is kept intact. It is also possible that the Radio 1010 is in fact running on top of another layer of communication stack, e.g. the Unlicensed Mobile Access (UMA) or any variance of the Generic Access Network (GAN).

Access Stratum (AS) 1020 is functional block that implements the radio access control and signalling to the cellular radio network, and the transport of information over the Radio 1010 access.

Backbone L2/L1 1100 is a functional block comprises of the hardware and firmware necessary to enable an eNB to communicate with the MME(s), Serving Gateway(s) and/or other eNB(s). It may include transmitting circuitry and receiving circuitry. It is obvious to anyone skilled in the art that this does not preclude the system to be used in a wireless environment, i.e. the Backbone L2/L1 1100 function can be replaced with wireless transmission means as long as interface with the IP 1090 is kept intact.

IP Protocols 1090 is a functional block comprises of the software that implements the internet protocols in order for the eNB to communicate with other nodes in the access network or core network.

GTP 1040 is a functional block comprises of the software that implements the GTP protocols in order for the eNB to communicate with other nodes in the core network which terminates the GTP protocols as well, i.e. Serving Gateway, PDN Gateway, and transmit/receive the UE's data to/from the core network node(s).

UDP 1050 is a functional block comprises of the software that implements the UDP protocols in order for the eNB to convey the GTP protocol messages to/from the core network node(s).

S1-AP 1060 is a functional block comprises of the software that implements the S1-AP protocols in order for the eNB to communicate with the MME in the core network such that the eNB is controlled by the MME and signalling messages for the UE(s) are conveyed over the S1-AP protocols.

X2-AP 1070 is a functional block comprises of the software that implements the X2-AP protocols in order for the eNB to communicate with other eNB(s) in the access network such that the eNB controls UE's handover with other eNB and UE's forwarding data is conveyed over the X2-AP protocols.

SCTP 1080 is a functional block comprises of the software that implements the SCTP protocols in order for the eNB to transmit/receive the S1-AP messages to/from the MME or X2-AP messages to/from other eNB(s).

Forwarding means 1030 is a functional block comprises of the software that implements the forwarding mechanism between the Radio 1010 and the Backbone L2/L1 1100 interfaces for UE's user data and signalling messages. For UE's user data, the forwarding means 1030 works as a bridge between the AS 1020 protocol and the GTP 1040 protocol, while for UE's signalling messages, it bridges between the AS 1020 protocol and the S1-AP 1060 protocol.

Handover Control means 1110 is a functional block comprises of the software that implements handover control mechanism for UE(s).

The present invention introduces the Restriction Information Processing Means 1200 and Handover Control means 1110 for handover utilizing the restriction information. Restriction information processing means 1200 obtains the restriction information provided from the MME for the UE, and utilizes it at handover decision or handover execution for the UE.

{Flowchart for eNB}

Figure 11:
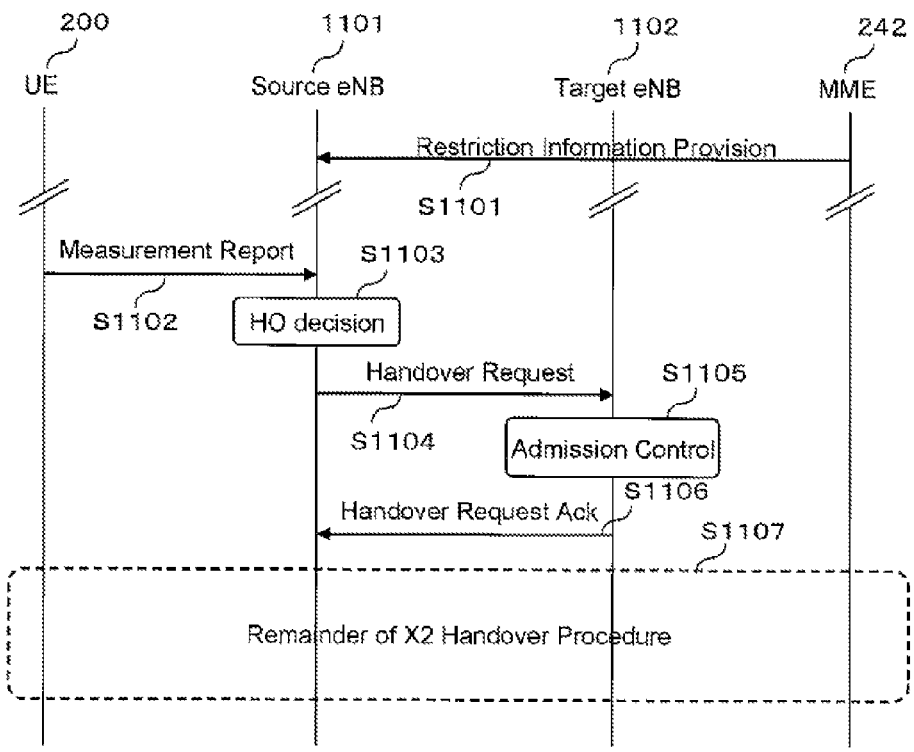
FIG. 11 shows a message sequence diagram of eNB according to a preferred embodiment of the present invention.

With above configuration on the eNB, it is depicted the disclosed method for the eNB in this embodiment in FIG. 11.

Firstly, the MME 242 provides the restriction information to the eNB (Source eNB 1101) (S1101), which restriction information contains above described information, i.e. Black Cell list, White Cell list, unregistered cell IDs, registered cell IDs, restricted PLMN ID, restricted Tracking Area ID, restricted cell IDs, etc. Restriction Information Processing means 1200 in the source eNB 1101 configures handover restriction list, which contains information on area, i.e. cell, tracking area, PLMN etc, to restrict the UE's to attach or handover. Such provision from the MME 242 may be done at UE's attachment to the eNB or at any time the eNB requires, i.e. the eNB requests to the MME 242 to provide the restriction information for the UE 200. Also the provision may be performed only when the eNB supports X2 interface for handover.

When receiving a measurement report provided by the UE 200 (S1102), Handover control means 1110 in the source eNB 1101 decides if handover is required for the UE 200 based on the measurement report and policy, and also if the handover is not restricted based on the provided restriction information, i.e. if the cell IDs in the restriction information cover the target cell (S1103). If there is no restriction seen after the decision, the handover control means 1110 proceeds handover procedure normally, i.e. simply sending Handover Request to the target eNB 1102. The source eNB 1101 may select the target eNB 1102 from one of registered cells or cells which are not restricted in the restriction information if available at handover decision phase. In this sense, if there are only restricted cells seen as candidates for the target cell, handover control means 1110 in the source eNB 1101 may not be initiate actual handover procedure, i.e. ignoring the measurement report from the UE 200.

If any restriction is found for the handover, the Handover control means 1110 either ignores the decision, i.e. ignoring the measurement report from the UE 200 and not sending Handover Request, or sends Handover Request to the target eNB 1102 including the request to limit/reduce the resource for the UE 200 (S1104). Handover control means 1110 in the target eNB 1102, which receives the handover request message from the source eNB 1101, performs admission control for the handover, and decides the resource limitation or reduction for the UE 200 (S1105).

The source eNB 1101 may request already limited or reduced value for the resource to the target eNB 1102 in the QoS parameter or policy/rule conveyed in the handover request message. In this case, the target eNB 1102 simply apply the value in the QoS parameter or policy/rule to its preparation of resource for the UE 200.

The source eNB 1101 may also simply indicate to the target eNB 1102 that the UE 200 is not allowed to handover to the target eNB 1102 but, e.g. for the purpose to track the UE 200, at least signalling plane needs to be kept, e.g. using a flag. In this case, the target eNB 1102 decides QoS parameter for the UE's user data on user plane, to be limited, e.g. to 0 kbps.

After the admission control and other processing, the handover control means 1110 in the target eNB 1102 returns handover request ack message to the source eNB 1101 (S1106). The target eNB 1102 may reject the handover request if the request itself is not granted due to the condition on the target eNB 1102, or the target eNB 1102 decides the handover for the UE 200 is not allowed because of the limitation/reduction of the resource, i.e. the handover will be failed. Afterwards, normal X2 handover procedure will be performed for the UE 200 (S1107) and limited/reduced resource is applied at the target eNB 1102 (target cell) for the UE 200, but at least signalling path is kept as normal so that the tracking of the UE 200 is possible for the network operator.

Figure 12:
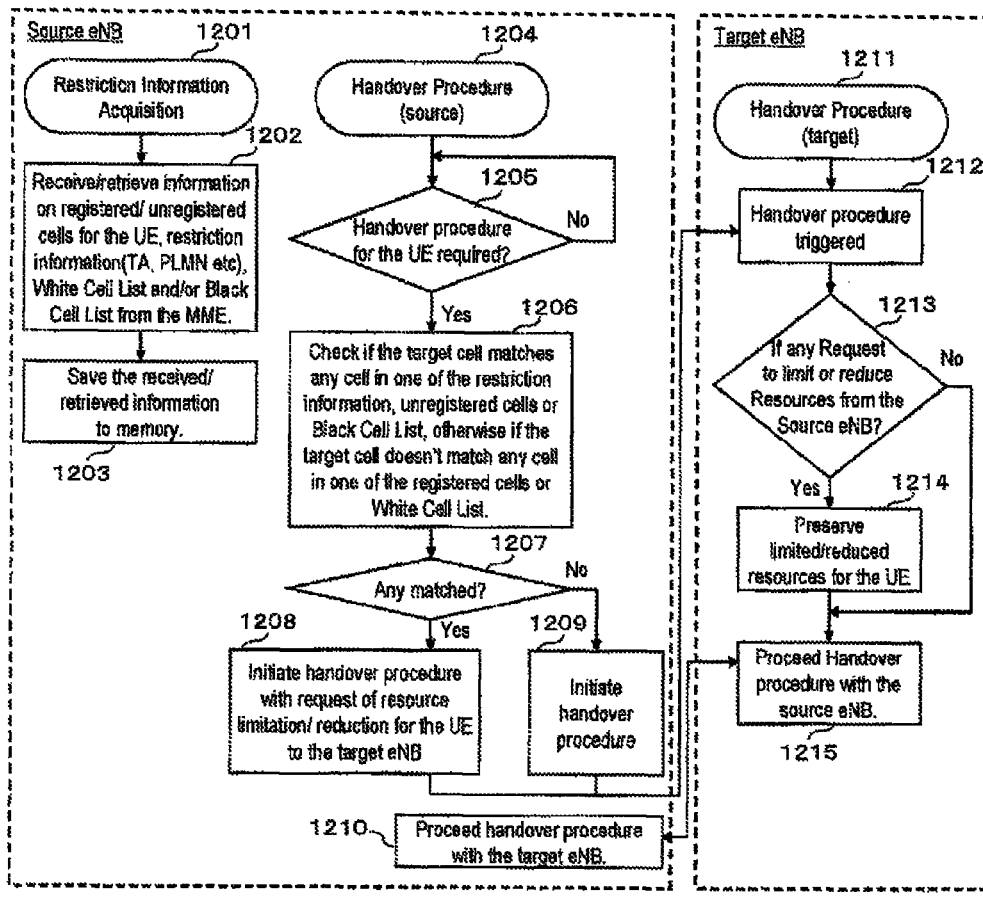
FIG. 12 shows a process in the eNB more in detail based on the configuration in FIG. 10.

FIG. 12 depicts the process in the eNB more in detail based on the configuration in FIG. 10.

Firstly, Handover control means 1110 performs restriction information acquisition process (S1201). Here, the handover control means 1110 receives or retrieves, according to its demand, the information on the restriction, i.e. registered cell IDs, unregistered cell IDs, restricted TA/PLMN/Cell IDs, White Cell List, Black Cell List etc, from the MME (S1202). Handover control means 1110 saves the restriction information, e.g. to the memory (S1203).

At handover procedure process (S1204), based on the received measurement report from the UE, handover control means 1110 decides if handover is required for the UE (S1205). If the handover is required, handover control means 1110 checks if the target cell matches any cell in one of the restriction information provided from the MME (S1206). Handover control means 1110 may also consider other restriction parameters than cell IDs, e.g. PLMN ID, Tracking Area ID etc. If there is any matched cell (or PLMN, TA etc) ID found (S1207), handover control means 1110 initiates handover procedure (i.e. sending handover request message to the target eNB) with request of resource limitation or reduction for the UE to the target eNB (S1208), otherwise normal handover procedure is initiated (S1209). The source eNB may stop the handover procedure if the target cell is not allowed for the UE to handover.

At the target eNB receiving the handover request message, the handover procedure is triggered in handover control means 1110 (S1211, S1212). If handover control means finds any request to limit or reduce resources in the handover request message from the source eNB (S1213), handover control means 1110 in the target eNB preserves limited/reduced resources for the UE (S1214), then proceeds handover procedures with the source eNB to the end (S1215, S1210).

EXAMPLE 5

For certain services or application, the target network, i.e. PDN, or the target PGW may be selected based on the location of the user, i.e. UE. Another case would change the contents of the service, the service authorization or security level for the service/application based on the user's location. For example, a company may allow for the employees to access confidential data in the corporate network only when they connect from limited places, i.e. within the area where the company is placed. As a detail of the example, a user connecting from outside of the office, i.e. via a base station which is placed outside of the office, may not be allowed to access confidential files in a file server (or may be allowed only when the user has taken more secure protection on the communication path) while the same user is allowed when connecting other base station placed in the office area, e.g. Femto base station. For another example, users trying to access to the corporate or home network from outside of the office or home may be forced to connect to a specific network for remote connection users, such that the security level could be kept higher to avoid crack the network resources.

In order to fulfill the system requirements as described above, in this embodiment, the system arranges the target network (i.e. PDN), PGW, contents of the service, the level of service authorization or security, etc. The system would control (change, modify, etc.) all, either or combination of them.

For the case that the target network (PDN) is arranged, the PGW switches from the serving PDN to the target PDN when the PGW detects the UE's location is changed based on the notification from the MME as described in the previous embodiments, The PGW may derive the target PDN from combination of the APN (Access Point Name) and UE's location information, e.g. FQDN containing the APN and UE's location information like (E) CGI, TAI, etc. Also, the information of the target PDN may be provided as static or dynamic data, e.g. subscription data in HSS or AAA server, where ID of the target PDN may be defined per location 1D. Once the target PDN is selected, the UE's bearers (e.g. EPS bearers, PDP contexts, etc.) or PDN connections will be bound to the target PDN at the PGW.

The change to the target PDN may cause change of the PGW. In such a case, the serving PGW will perform gateway relocation procedure to the target PGW, where the serving PGW transfers UE contexts to the target PGW and the target PGW starts maintain the UE contexts.

In case that the PDN and/or PGW is changed but preservation of the UE's address (i.e. IP address) is not applied, a new address is provided to the UE, i.e. through the procedures for attach, service request, tracking area update, etc. (over messages for create bearer response, modify bearer response, etc.)

For the case that the contents of the service or the service authorization is arranged, the PGW informs the service server or the application server in the PDN about change of the UE's location and/or the location information. Here, the PGW may already have information (e.g. as one of UE contexts) about the location or area (e.g. (E)CGI, TAI, CSG ID, etc) for the PGW to inform the UE's location only when the UE is at the provided location or area. Otherwise, the PGW may inform the UE's location every time the UE changes the location.

In case that the service contents or service authorization is changed, additional access authentication may be performed. For example, typical access authentication (i.e. using password, access credential, security token, etc.) to the authentication server in the target PDN, or the same authentication procedure performed at UE's attachment using SIM and subscription data may be performed.

For the case that the security level is arranged, the PGW informs the MME (otherwise the MME detects by itself the change of the UE's location) and the MME may modify the parameters for the UE's bearer security. For example, the access from CSG cell outside of the company area, the MME will modify the parameters to make the bearer security higher than normal and initiate bearer reconfiguration with the modified security parameters. Also the PGW may initiate or upgrade the secure path between the PGW and the PDN (i.e. the gateway in the target PDN to be connected with the PGW). Furthermore, the PGW or the MME may indicate the UE to initiate a secure path (e.g. IPsec tunnel) with the service/application server or peer device/terminal in the target PDN. The indication may be sent to the PDN (i.e. the service application server or peer device/terminal).

Since it is possible for the system to change/arrange/control/modify the target PDN and/or PGW, contents of the service, the service authorization, security level, and so on, such that the extensible services/applications can be provided even after its deployment.

EXAMPLE 6

UE Activity Based Filter Processing

Hereafter, the UE 10 or Network Node 20 refers to any device with networking capabilities. For example, it may entirely be possible for a part of the functionality of the Network Node 20 to be implemented in the Mobility Management Entity (MME) and/or Serving Gateway (SGW) as specified in current 3GPP SAE architecture. Also, UE 10 here mainly refers to functionality implemented in a plethora of devices as M2M devices but this does not limit the concepts explained here from being applied to any other networking device. Here the UE 10 sets up the specific service as a prior packet filter list, and the network determines that the UE is not capable of processing data associated with the packet filter list when the UE 10 is in idle mode.

Figure 13:
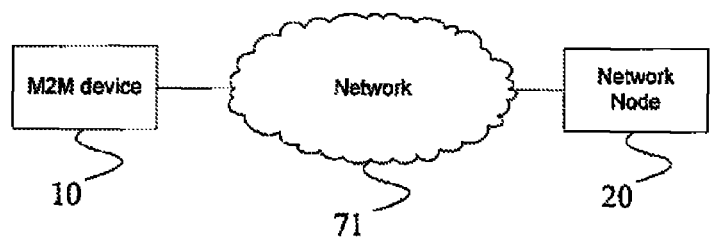
FIG. 13 describes the system configuration of a system that performs activity based filter processing.

FIG. 13 describes the system configuration of a system that performs activity based filter processing. It consists of a UE 10, shown as a M2M device 10 in the figure, that provides an Allowed packet List with an idle mode use only indication to a Network Node 20 and a Network Node 20 that on receipt of the Allowed packet list with the idle mode use only indication filters downlink packets based on the Allowed packet List when the UE 10 is in idle mode. The UE 10 and the Network Node 20 communicate with each other across a Network 71. The Network 71 could be a wireless network. The Network 71 could also be IP enabled. The UE 10 may also provide a Store Disallowed packet Info indication to the Network Node 20. The Network Node 20 on receiving the Store Disallowed packet Info indication stores the packet info of the packet that does not match the Allowed packet List. The information stored of the packet that does not match the Allowed packet List could be the IP address or port number of the source or destination of the packet. The Network Node 20 sends the Disallowed packet List to the UE 10 after the UE 10 moves to Connected mode.

Figure 14:
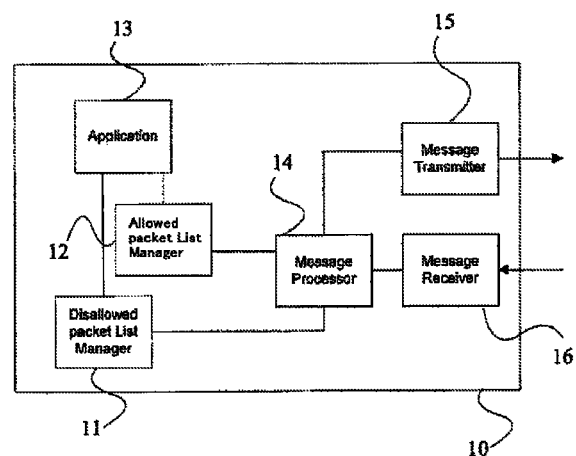
FIG. 14 is a diagram illustrating another preferred apparatus of the UE.

FIG. 14 describes the apparatus of the UE 10 in this preferred embodiment of the invention. It consists of an Application 13 that is optimized for low power usage. The Application 13 can be any of the particular uses of M2M devices. Non-limiting examples can be the smart metering, temperature sensors, cameras, logistic devices, etc.

The Application 13 needs to be aware that a message or packet is critical or non-critical (in other words, urgent or non-urgent, or, important or not-so-important). This can be achieved in 2 ways. The first method is to use a standardized list of port numbers or IP addresses to identify a message or packet as critical. For example, only messages with port number "xyz" are critical. The rest of the messages using other port numbers are non-critical. The second method is to have a P2P exchange between the application server and the UE 10 to dynamically obtain this information.

Once this information is obtained, this critical packet information is provided to the Allowed packet List Manager 12. In a typical implementation, this can be provided to the NAS which implements the Allowed packet List Manager 12 by using an AT command. The Allowed packet List Manager 12 forwards the Allowed packet List to the Message Processor 14. The Message Processor 14 prepares a message to send this information to the Network Node 20. All outgoing messages are sent by the Message Transmitter 15. Incoming messages are received by the Message Receiver 16. With respect to this invention, the messages that may received by the Message Receiver 16 is the Disallowed packet List that the Network Node 20 provides the UE 10 with when the UE 10 moves to Connected mode, otherwise paging message for the critical packet described in Allowed packet List. When the Message Receiver 16 receives the Disallowed packet List, the Message Processor 14 takes the Disallowed packet List and provides it to the Disallowed packet List Manager 11. The Disallowed packet List Manager 11 provides the Application 13 with the Disallowed packet List. Again, the AT command can be used to transfer the information from the Disallowed packet List Manager 11 to the Application 13.

Though it is seen that Allowed packet list would commonly use IP addresses or port numbers to filter packets, it can also possible to filter packets by other filter criteria such as IPv4 remote address type, IPv6 remote address type, Protocol identifier/Next header type, Local port range type, Single remote port type, Remote port range type, Security parameter index type, Type of service/Traffic class type Flow label type, contents of a transport layer header (e.g. UDP, TCP, SCTP), contents of a further upper layer header (e.g. SIP, TLS, HTTP), tunnel header configuration, and/or parts of contents in the payload (e.g. application/user data).

Figure 15:
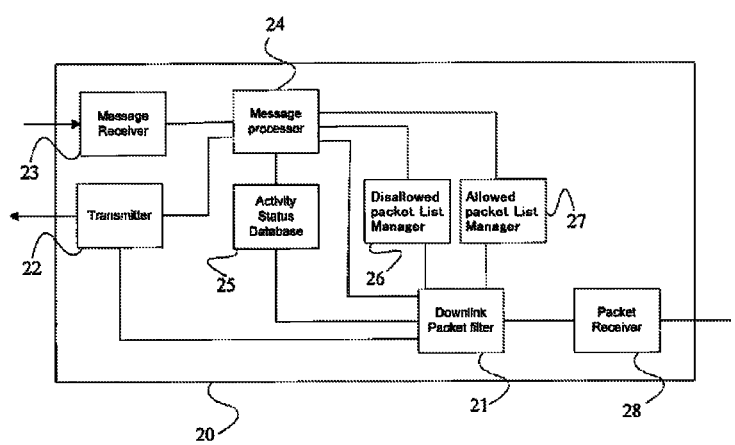
FIG. 15 is a diagram illustrating the preferred apparatus for the Network.

FIG. 15 describes the apparatus of the Network Node 20 in the preferred embodiment of the invention. It consists of a Message Receiver 23 that receives messages from the UE 10. Messages received are provided to the Message Processor 24 for further processing. In this invention, the Message Processor 24 will receive the Allowed packet List from the UE 10 with an "Idle mode use only" indication (or flag) optionally with a "Store Disallowed packet info" indication. The Message Processor 24 will then provide the Allowed packet List and the indications to the Allowed packet List Manager 27. The Allowed packet List Manager 27 and the indications are used by the Downlink Packet filter 21 to check if downlink packets pass the filters provided by the Allowed packet List. When a downlink packet arrives at the Packet Receiver 28, the Packet Receiver 28 forwards the packet to the Downlink Packet filter 21. If the "Idle mode use only indication" is present, the Downlink Packet filter 21 checks the current activity status (or mobility status) of the UE 10 querying the Activity Status Database 25. If the Activity Status Database 25 informs the Downlink Packet filter 21 that the UE 10 is in Connected mode, then the Downlink Packet filter 21 forwards the packets to the Transmitter 22 without filtering the packets with the Allowed packet List. If the Activity Status Database 25 informs the Downlink Packet Filter 21 that the UE 10 is in idle mode, then the Downlink Packet filter 21 checks whether the packets received by the packet receiver conform to the Allowed packet List Manager 27.

If the packets conform to the Allowed packet List, then the Downlink Packet Filter 21 first requests the Message Processor 24 to page the UE 10. The Message Processor 24 sends a paging message to the UE 10 via the Transmitter 22. When the UE 10 does setup a connection with the Network Node 20, the Message Processor 24 obtains via the Message Receiver 23 a paging response message from the UE 10, then the Downlink Packet filter 21 requests the Disallowed packet List Manager 27 for the Disallowed packet List information. The Downlink Packet Filter 21 then forwards the packet to the Transmitter 22 which further transmits the packets to the UE 10.

If the packets do not conform to the Allowed packet List, the Downlink Packet filter 21 checks for the "Store Disallowed packet Info" indication, if available. If the indication is present, the Downlink Packet filter 21 provides the details of the packet to the Disallowed packet List Manager 26. These details can range from IP address of the source, IP address of the destination, port number of the source, port number of the destination, other parts of the header(s) and/or parts of the payload. The invention does not limit the details to be passed to the examples presented in the previous sentence. Further details such as storing the whole packet could be performed. The Disallowed packet List Manager 26 stores the relevant details of the Disallowed packets and forwards them to the UE 10 when the UE 10 moves to connected mode. If there is no "Store Disallowed packet info" indication, the Downlink Packet Filter 21 just discards the packet and does n act anymore on the packet.

Figure 16:
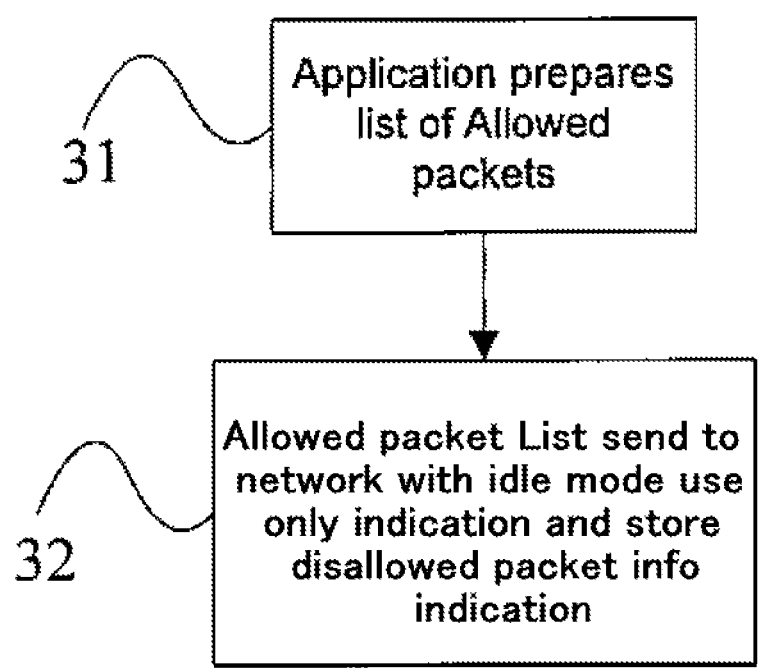
FIG. 16 is a diagram illustrating the preferred method of UE configuring mobility aware packet filter information.

FIG. 16 illustrates the processes required for the UE 10 to setup the activity based packet processing. First, in step 31, the application prepares a list of Allowed packet List. The application may provide only parts, i.e. essential contents, of the Allowed packet list such as the target IP address and/or the target port number, from which then the UE 10 constructs a complete form of the Allowed packet List. Then in step 32, the prepared Allowed packet list is sent to the Network Node 20 with the "idle mode use only" indication optionally with the "Store Disallowed packet info" indication. For example, if this concept is implemented in 3GPP architecture, the application would provide the NAS layer using an AT command, specifically the ESM sub-layer with the list of these packets and its preference for use only in idle mode preference to store the Disallowed packets. The ESM sub-layer initiates a UE requested bearer allocation procedure and populates the TAD (traffic aggregate description) with the filters provided by the application. Additionally, the ESM sub-layer populates the "idle mode use only" indication and the "Store Disallowed packet info" indication in this message.

Figure 17:
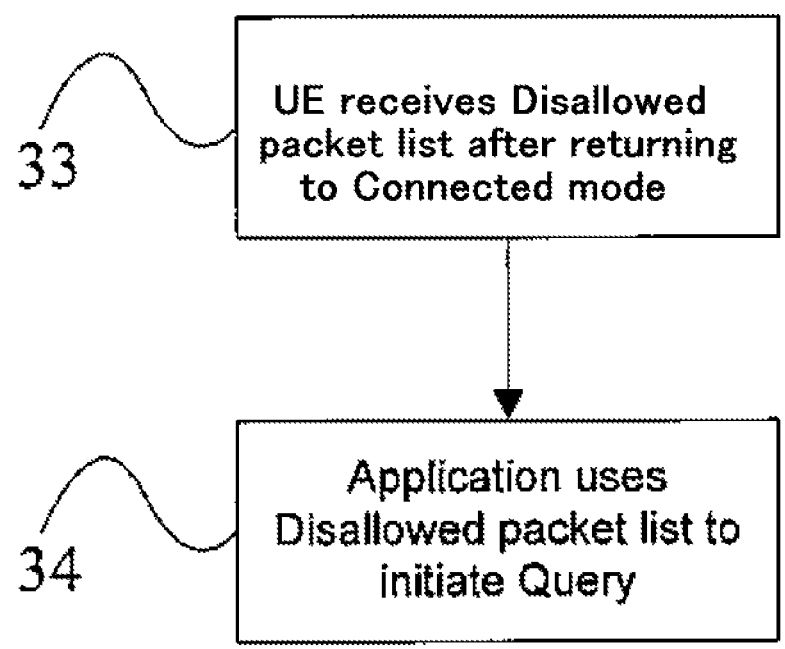
FIG. 17 is a diagram illustrating the preferred method of UE to process Disallowed packet lists.

FIG. 17 illustrates the processes required for the UE 10 to process the Disallowed packet List. If the UE 10 has setup storing of Allowed packet List as explained previously, the Network Node 20 would have stored information regarding packets that didn't conform with the Allowed packet List. When the UE 10 moves from idle mode to connected mode either because of pending uplink data or signalling or paging from the network, it receives the Disallowed packet List as shown in step 33. When implemented for 3GPP architecture, this message could be sent in a new message such as service accept or a container IE. The information of the packets (i.e. the Disallowed packet List) received in the service accept message is provided to the upper layer (e.g. application). This could be done via the AT command. In step 34, the upper layer could then start a query message to the destinations identified. The objective of the query message is to find out why the UE 10 was originally contacted and provide any information needed.

Figure 18:
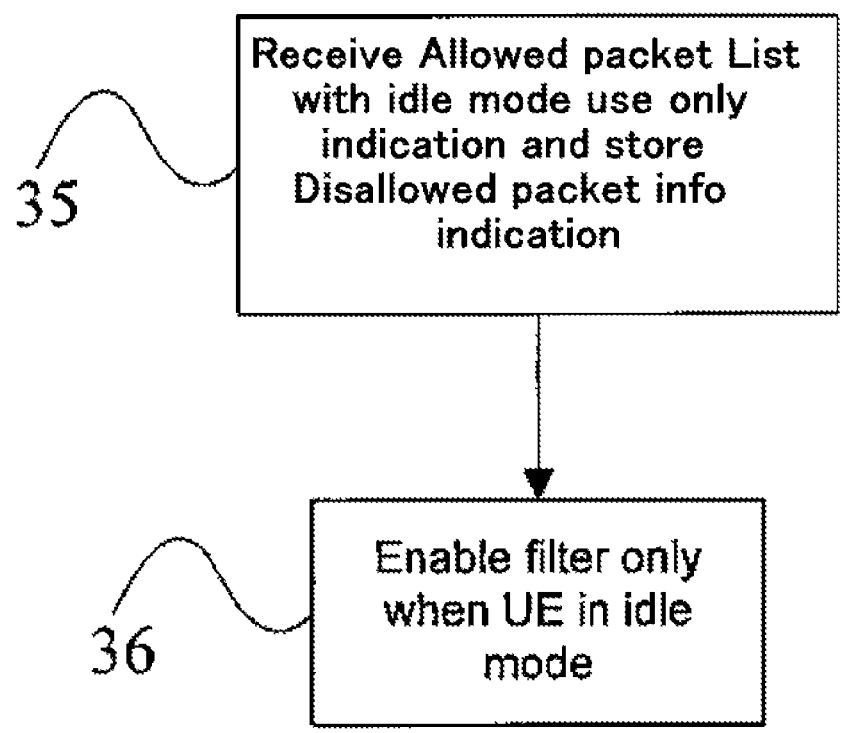
FIG. 18 is a diagram illustrating the preferred method required in the Network to configure the activity based packet processing.

FIG. 18 illustrates the processes required for the Network Node 20 to configure the activity based packet processing. First, in step 35, the Network Node 20 receives the Allowed packet List with the "idle mode use only" indication and the "Store Disallowed packet info" indication. When the Network Node 20 receives the "idle mode use only" indication, in step 36 it remembers that the Allowed packet List must be used only when the UE 10 is in idle mode.

Figure 19:
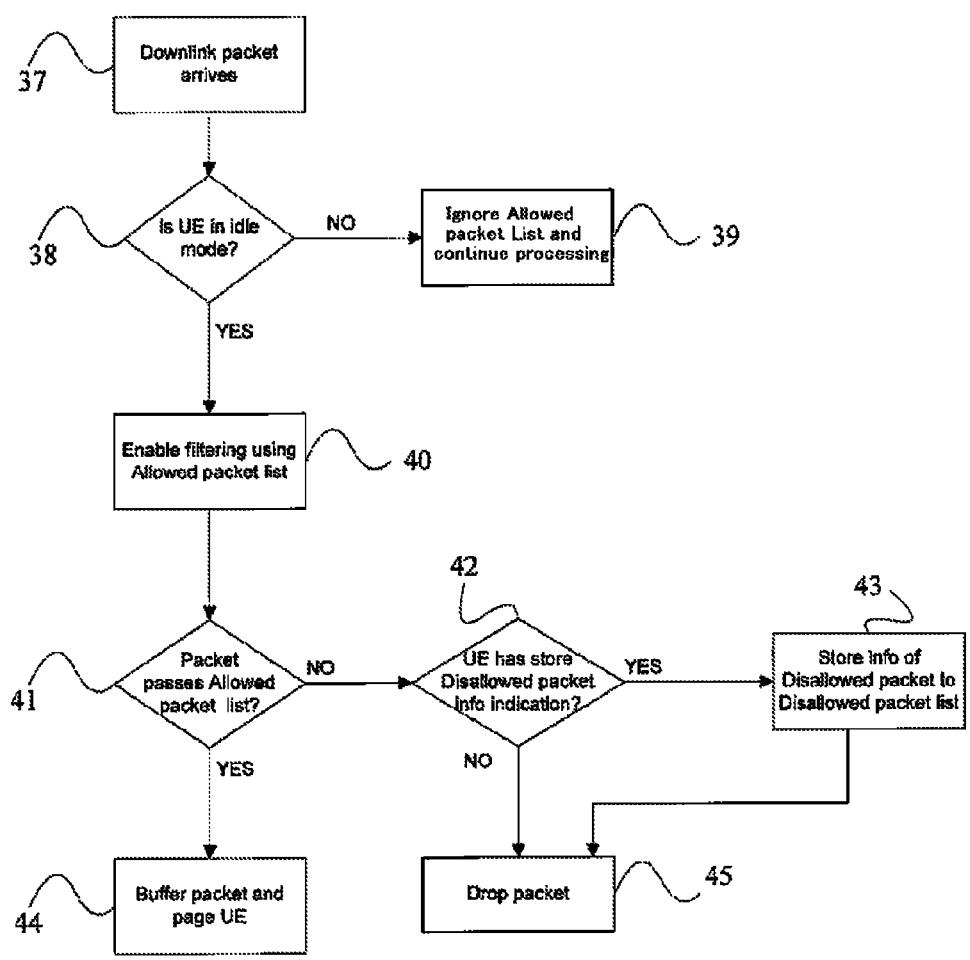
FIG. 19 is a diagram illustrating the preferred method of mobility aware packet filter processing by the Network.

FIG. 19 illustrates the process required for the Network Node 20 to run the activity based packet processing. The process is triggered when a downlink packet arrives as shown in step 37. After receiving the packet, in step 38, the Network Node 20 checks if the UE 10 is in idle mode. If the UE 10 is not in idle mode, the Network Node 20 ignores the Allowed packet List and continues processing as in step 39. If the UE 10 is in idle mode, it enables the filtering using the Allowed packet List as shown in step 40. In step 41, the Network Node 20 verifies if the packet has passed the filters in the Allowed packet List. If the packet has passed the filters, it is seen as the Allowed packets that are critical and are buffered while the UE 10 is being paged and after the UE 10 is paged the buffered packets are forwarded to the UE 10. If the packet does not pass through the Allowed packet List, in step 42 the Network Node 20 checks whether the UE 10 indicated the "Store Disallowed packet info" indication. If the UE 10 has not provided the "Store Disallowed packet info" indication, the Network Node 20 may drop the packet as shown in step 45. If the UE 10 has provided the "Store Disallowed packet info" indication, the Network Node 20 may store information of the Disallowed packet, i.e. which did not pass through the Allowed packet List, in the Disallowed packet List as shown in step 43. The information stored can range from IP address of destination or source, or port number of destination or source.

Figure 20:
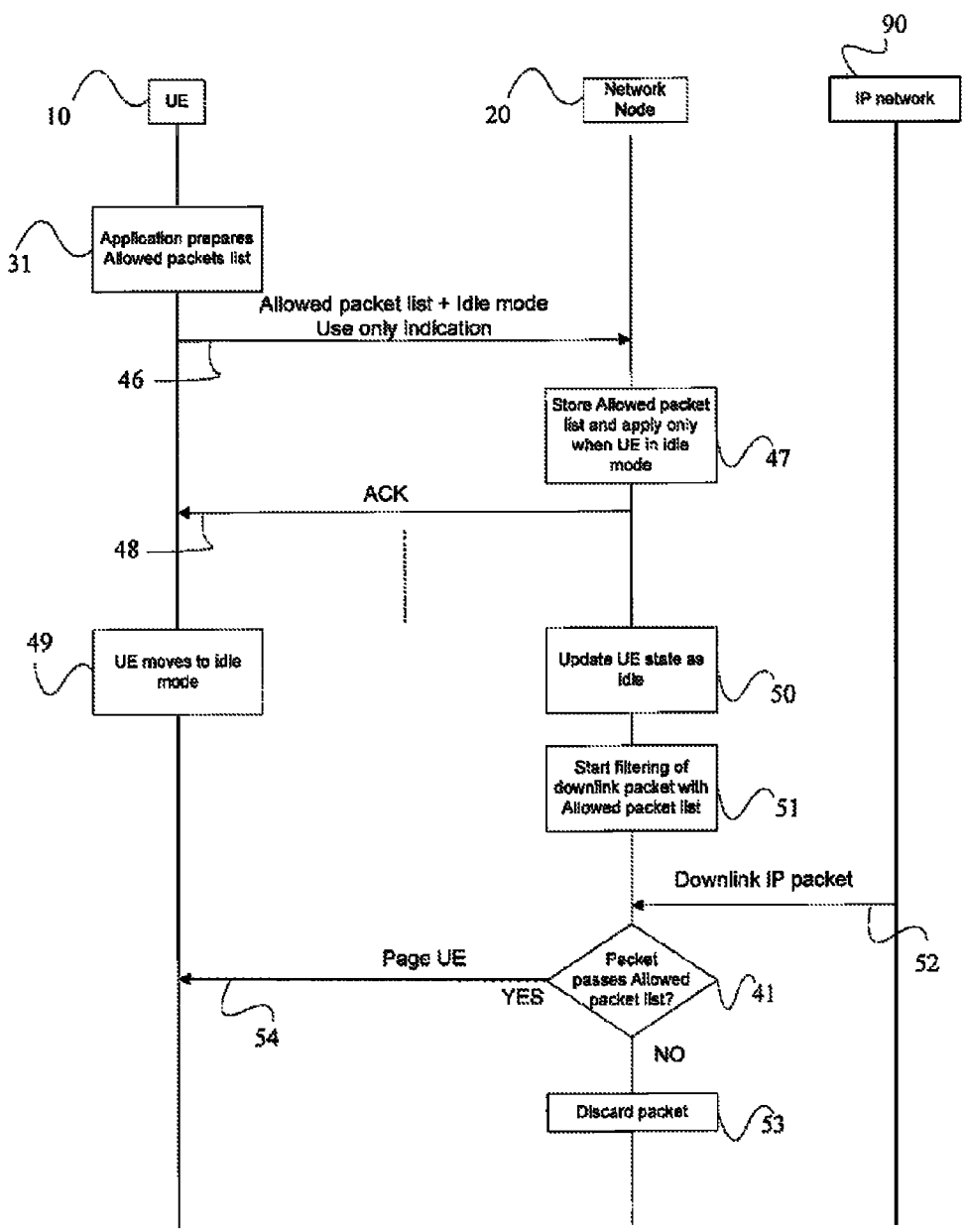
FIG. 20 is a diagram illustrating the preferred method of idle mode only packet filtering.

FIG. 20 illustrates the sequence chart of events for activity based packet processing. First, the UE 10 prepares Allowed packet List consisting of filters that will be used to check downlink packets. The filters may consist of IPv4 remote or destination address type, IPv6 remote or destination address type, Protocol identifier/Next header type, Local port range type, Single local/remote port type, Remote port range type, Security parameter index type, Type of service/Traffic class type and Flow label type. Next in step 46, the UE 10 sends the Allowed packet List with the "idle mode use only" indication. In step 47, the Network Node 20 stores the Allowed packet List and remembers to apply this list only when the UE 10 is in idle mode. It then acknowledges the UE's 10 request to apply the Allowed packet List in case of idle mode only in step 48. The acknowledgment may be omitted so that the UE 10 can enter idle mode quickly after sending the message in step 46 and reduce battery consumption.

After a period of time, the UE 10 goes to idle mode as shown in step 49. For example in 3GPP, usually this happens when the UE 10 is inactive for sometime and the MME detects this inactivity and releases the S1 signalling connection. Here the diagram is simplified and is shown in step 50 where the Network Node 20 updates the UE 10 state as idle. This change of UE 10 state triggers the filtering of downlink packets with the Allowed packet list as shown in step 51. When a downlink IP packet arrives to the Network Node 20, e.g. from internal or external IP network 90 (step 52), the Network Node 20 checks as shown in step 41 if the IP packet passes the filters in the Allowed packet list. If packet passes through the filters in the Allowed packet List, the Network Node 20 decides to page the UE 10 as shown in step 54. This is needed as the UE 10 would have assigned these filters to identify critical packets. If the downlink IP packet does not pass through the filters assigned, the Network Node 20 discards the packet and decides not to page the UE 10 (step 53).

Here the IP packet may contain an optional indication, e.g. a flag or bit field in the packet header or payload, to pass the packet itself through the filter despite of the UE's idle mode state. The indication can be added according to the contents of the packet, e.g. with urgency, importance, etc, by a correspondent node which is the sender of the packet, such that the application on the correspondent node can force to deliver to the UE 10 any important or urgent packet which is not (or is not assumed to be) listed yet in the filter in the Network Node 20 then the flexibility of the application will be increased. Also the indication may be controlled (i.e. added, modified or deleted) by other node than the correspondent node on the path between the correspondent node and the Network Node 20, e.g. PGW or some server in the IP network 90 (i.e. PDN), in order to reflect a policy of the operator's network, e.g. due to a restriction that any registration is required to the filter before passing any packet.

Furthermore, the Network Node 20 may notify the correspondent node, which sent the packet to the UE 10, about the UE's unavailability because of its idle mode state, such that the correspondent node can consider the UE's temporary unavailability and postpone sending further packets to the UE 10, e.g. until when the correspondent node receives any message or packet from the UE 10, when a defined timer period is expired, when a defined time (which could be subscribed to the UE 10 as a Time Controlled period only during which period the UE 10 is allowed to access the network) comes, when a important or urgent message to be sent to the UE 10 is generated, etc. For example, a SGW which implements all or parts of the Network Node 20 informs a PGW serving the UE 10 about the UE's unavailability due to its being in idle mode, the PGW notifies or forwards the UE's unavailability to the correspondent node. The Network Node 20 also can notify the correspondent node about the UE's availability when the UE 10 gets in connected mode, such that the correspondent node can resume sending packets to the UE 10 immediately after receiving the notification without waiting for packets from the UE 10, which consumes time and is inefficient. For example, the MME notifies about UE's state transition from idle mode to connected mode through the SGW and the PGW to the correspondent node.

Figure 21:
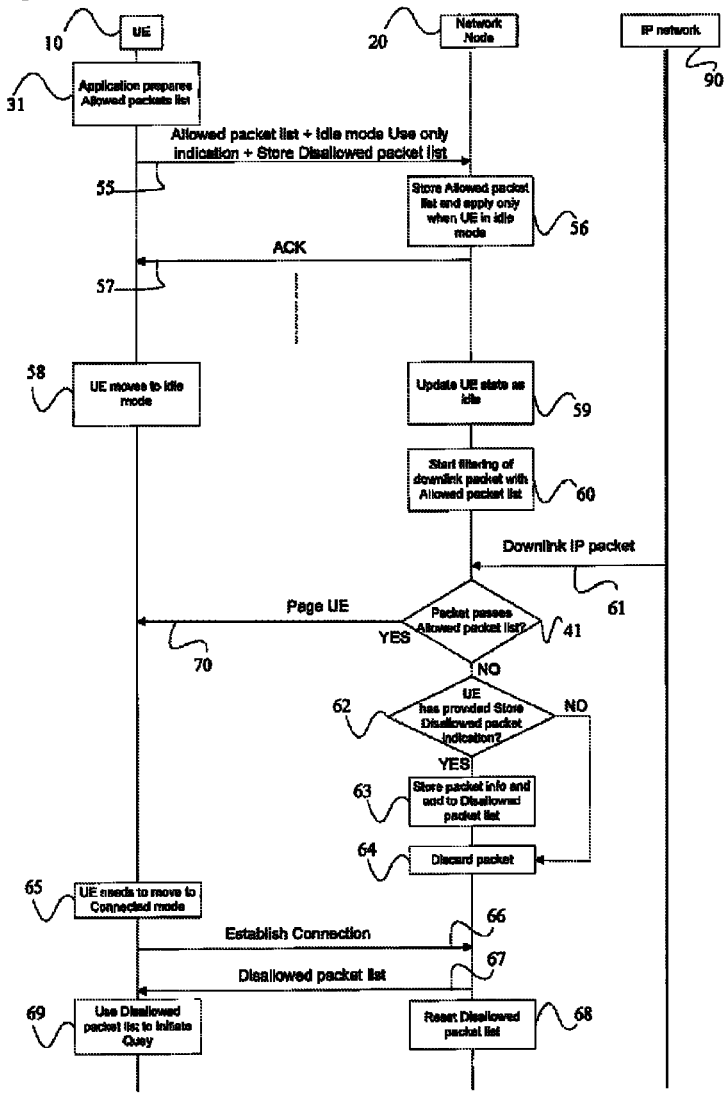
FIG. 21 is a diagram illustrating the preferred method of idle mode only packet filtering with info storing.

FIG. 21 illustrates the sequence chart of events for activity based packet processing with storing of Disallowed packet List. First, the UE 10 prepares Allowed packet List consisting of filters that will be used to check downlink packets. The filters may consist of IPv4 remote or destination address type, IPv6 remote or destination address type, Protocol identifier/Next header type, Local port range type, Single local/remote port type, Remote port range type, Security parameter index type, Type of service/Traffic class type and Flow label type. Next in step 55, the UE 10 sends the Allowed packet List with the "idle mode use only" indication. In step 56, the Network Node 20 stores the Allowed packet List and remembers to apply this list only when the UE 10 is in idle mode. It then acknowledges the UE's 10 request to apply the Allowed packet List in case of idle mode only in step 57. The acknowledgment may be omitted so that the UE 10 can enter idle mode quickly after sending the message in step 55 and reduce battery consumption.

After a period of time, the UE 10 goes to idle mode as shown in step 58. In 3GPP, usually this happens when the UE 10 is inactive for sometime and the MME detects this inactivity and releases the S1 signalling connection. Here the diagram is simplified and is shown in step 59 where the Network Node 20 updates the UE 10 state as idle. This change of UE 10 state triggers the filtering of downlink packets with the Allowed packet List as shown in step 60. When a downlink IP packet arrives to the Network Node 20, e.g. from internal or external IP network 90 (step 61), the Network Node 20 checks as shown in step 41 if the IP packet passes the filters in the Allowed packet List. If packet passes through the filters in the Allowed packet List, the Network Node 20 decides to page the UE 10 as shown in step 70. This is needed as the UE 10 would have assigned these filters to identify critical packets. If the downlink IP packet does not pass through the filters assigned, the Network Node 20 checks in step 62 whether the UE 10 has provided the "Store Disallowed packet Info" indication.

If the indication is provided, the Network Node 20 stores the information of the packet (step 63). This information can range from IP address of source/destination, port number of source/destination or even the whole packet itself. If the UE 10 has not provided the "Store Disallowed packet info" indication, the Network Node 20 discards the packet as shown in step 64. After a period of time, the UE 10 re-establishes a connection with the network as shown in step 66 either due to uplink data pending or the network having received packets that pass through the Allowed packet list. The reason is not shown in the figure but it may be inferred to be any of the reasons that may result in the UE 10 moving to Connected mode (step 65). When the UE 10 establishes a signalling connection with the Network Node 20 (step 66), the Network Node 20 may use the opportunity to send the Disallowed packet List to the UE 10 as shown in step 67. After successfully sending the Disallowed packet List to the UE, the Network Node 20 resets the Disallowed packet List (step 68). The UE 10 receives the Disallowed packet List and provides it to the upper layer (i.e. application). The application may use the information to query each sender as shown in step 69 about the nature of the initial request sent to the UE 10.

In one embodiment of the invention, the UE 10 is a 3GPP compliant UE with either or all of GERAN, UTRAN and E-UTRAN radios. The SGSN/MME or the GGSN/S-GW performs the function of the Network Node. The Allowed packet List is stored in the SGSN or the S-GW depending on whether the UE 10 is currently in GERAN/UTRAN or in E-UTRAN. The UE 10 performs the configuration of the Allowed packet List using control signalling, called NAS or non-access stratum signalling. The UE 10 uses UE initiated bearer/PDP context modification message to add downlink filters to the default bearer/PDP context of a PDN connection. If the UE 10 has multiple PDN connections, separate messages may be needed to each PDN connection. Adding downlink filters to the default bearer/PDP context ensures that downlink packets that don't conform to the TFT will be blocked automatically.

Along with the downlink filters, the UE 10 must indicate that the usage of the filters should only be when the UE 10 is in idle mode. So, these filters should probably not be forwarded to GGSN or P-GW which actually does filtering. Implementing these features in SGSN or S-GW has two advantages. First, these entities are aware of the UE mobility status—idle or connected. Second, implementing these features in these entities eliminates impact of this invention to the GGSN or the P-GW. In S1 mode, that is when the UE 10 is using its E-UTRAN radio, the signalling is performed through the MME. That is, the MME forwards the control signalling messages between the UE and the SGSN/S-GW. Once the downlink filters are stored in the SGSN/S-GW, the SGSN/S-GW is aware of the UE 10 activity. If the UE 10 is in connected mode, there is no change to any of their normal operations. But when the UE 10 is in idle mode, the S-GW enable the filtering of the downlink filters that were marked as "idle mode use only" by the UE 10. Now, the S-GW checks each downlink packet for conformance with these downlink filters.

If the packet passes the downlink filters, it means that the packet is important (or critical, urgent, high prioritized, etc.) and the SGSN/S-GW decides to page the UE. If the packet doesn't pass the downlink filters, it means that the packet is not so important (or non-critical, non-urgent, non-high prioritized) and the packet information, mainly the source/destination IP addresses and the source/destination port numbers are stored. When the UE 10 moves to connected mode, that is when the UE 10 sends a service request message to the SGSN/MME, a signalling connection is established with the network. In recent 3GPP system (i.e. after rel-8), it is expected that even the user plane is established along with the control plane, such that once the service request procedure is completed, the UE has both signalling bearers and data bearers. So, the SGSN/S-GW can either use the signalling bearers or the data bearers to send the Disallowed packet List, if any, to the UE 10. The UE application 13 then uses this list to initiate query messages.

The concept in this invention is for applications in M2M applications to be able to align operations with the low power requirements of the devices. Let's say the application is a surveillance camera with a central server and multiple clients (PDAs, mobiles, etc). The server is responsible for monitoring the surveillance camera and the clients may request current video that the surveillance camera is capturing. Monitoring the surveillance camera could range from retrieving the last few minutes of video, checking if the camera is working ok, sending software upgrades, etc. Now, when the application is being designed, the messages can be divided into important (e.g. sensitive data, alert data, urgent data, prioritized data, etc) and unimportant (e.g. non-sensitive data, non-alert data, non-urgent data, non-prioritized data, etc) messages. Important or time sensitive messages could use particular port numbers, e.g. 50000. Further, the IP addresses that are listed as important could also be listed down, e.g. 10.10.10.10, 10.10.10.11. Now, all other messages will not conform to this filter configuration. What the application does is inform the lower layer (NAS) about the specification of the filter. The NAS then informs the network (SGSN or the S-GW) about these filters and the idle mode use only policy.

Now let's say getting the last 5 minutes of video is critical. In this case, the server uses 50000 as the port number and tries to setup a TCP connection for example. As the IP packet reaches the S-GW, if the UE 10 is idle, the S-GW sees the packet as important and pages the UE. So, important packets are sent through.

Now, let's assume the UE goes back to idle mode. If the server needs to do a non-urgent software upgrade, it uses a port other than 50000. When the IP packet reaches the S-GW, the S-GW sees that the IP packet doesn't conform to the packet filters it has for idle mode use only. So, it decides to discard the packet by store the contents of the packet. Here, the IP address of the server 10.10.10.10 and port number (e.g. 50002) is stored by the S-GW. The next the UE 10 goes to connected mode, the S-GW sends this information (source IP address: 10.10.10.10 and port number 50002) to the UE. The UE application then either determines the type of message sent based on the port number used and sends the response straight away or the UE application may send a generic query message to the server. The server now has a connection with the UE 10 and continues with the software upgrade. So, in this way, the network and application wake up the UE only when needed and help in maximizing the power usage of the UE.

EXAMPLE 7

Signaling Setup Based on Type of Uplink Data

Figure 22:
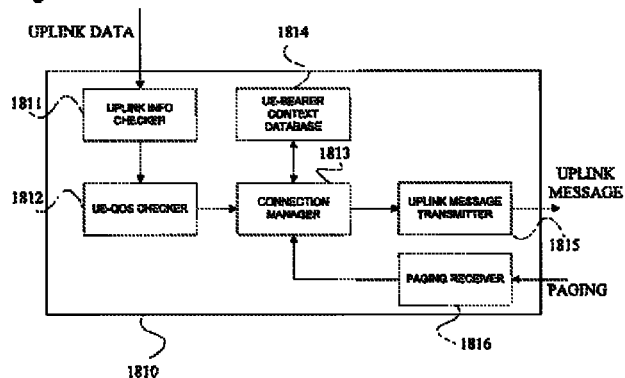
FIG. 22 is a diagram illustrating another embodiment of the UE apparatus.

FIG. 22 describes the apparatus of the UE 1810 in another embodiment of the invention. It consists of an Uplink Info Checker 1811 that has the responsibility for monitoring the presence of pending uplink data or signalling. When uplink signalling is pending, the Uplink Info Checker 1811 informs the Connection Manager 1813. When uplink data is pending, the Uplink Info Checker 1811 informs the UE-QoS Checker 1812. When both uplink data and uplink signalling is pending, the Uplink Info Checker 1811 informs the UE-QoS Checker 1812.

The UE-QoS Checker 1812 is the module that checks the QoS properties of the data. If the data is IP, the QoS may check the Type of Service filed of the IP packet. Other information that could be used to detect high priority are IPv4 remote/local address type, IPv6 remote/local address type, Protocol identifier/Next header type, Local port range type, Single remote port type, Remote port range type, Security parameter index type, Type of service/Traffic class type and Flow label type. It could be pre-configured in the UE to use certain parameter types when high priority uplink data is to be sent. When such parameters are used in the packets, the UE-QoS Checker may detect the high-priority situation.

Or the application may provide other forms of QoS information to the UE-QoS Checker 1812. The main decision that QoS Info takes is whether the pending uplink data has a real-time requirement or not. The QoS Info Checker provides this information to the Connection Manager 1813. The Connection Manager 1813 has various tasks. It is first of all informed of any pending uplink data or signalling.

If uplink data is pending, it receives information of whether the data is real-time. If the data is real-time, the Connection Manager 1813 prepares a status message to be sent with a real-time indication to the Network Node 20 in the Network 240. If the data is non-real time, the Connection Manager 1813 prepares a status message to be sent with a non-real time indication to the Network Node 20 in the Network 240.

After deciding the type of indication to provide, the Connection Manager 1813 provides the message in appropriate coded format to the Uplink Message Transmitter 1815. The Uplink Message Transmitter 15 is a logical transmitter of uplink information.

It may actually be implemented by several modules that in addition may perform radio resource control, re-ordering, ciphering, integrity protection and physical transmission. The Paging Receiver 1816 is a module that receives the paging issued by the Network Node 20 in the Network 240. After receiving the paging, the paging message is forwarded to the Connection Manager 1813.

In 3GPP, the indication may be coded in different ways. For example, one way to code is that when there is real-time requirement, the UE 1810 just sends a normal service request. When there is no real-time requirement, the UE provide the extended service request with bearer context status.

Another method to do this is the reverse case. For real-time requirement, an extended service request with indication of high priority may be provided. A normal service request with no indication of high priority can be treated as low priority by the Network Node 20 in the Network 240. A person skilled in the art could codify the above method in numerous ways, and hence the invention is not restricted by type of service request used.

Figure 23:
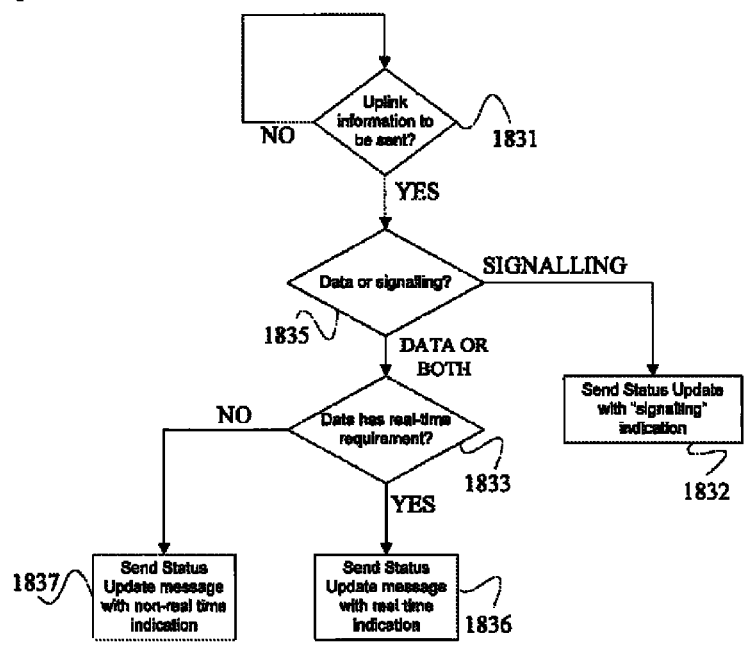
FIG. 23 is a diagram illustrating the preferred method of evaluation of uplink data pending in the UE.

FIG. 23 is a diagram illustrating the preferred method of evaluation of uplink data pending in the UE. While in idle mode, the UE 1810 constantly checks for pending uplink information as shown in Step 1831. If there is pending uplink information, the UE 1810 checks whether it is data or signaling as shown in Step 1835. If the uplink information is only signalling, then the UE 10 sends a status message with signaling indication as mentioned in step 1832. The "signalling" indication can be coded in a number of ways.

One method is to specify a new message called signalling service request that has the sole purpose of informing the Network Node 20 that a signalling connection is needed. Another method is to specify an optional information element, e.g. consisting of 4 or 8 bits, in the normal service request message that indicates that this service request is for signalling reasons. If the uplink information has both data and signalling, then the UE 1810 judges if the data has real-time requirement as shown in Step 1833. This can be checked in a variety of ways.

One possible way is to check the TOS field of the IP data, such that no additional field is required in the message because the existing resource can be used for this purpose. Other information that could be used to detect high priority are IPv4 remote/local address type, IPv6 remote/local address type, Protocol identifier/Next header type, Local port range type, Single remote port type, Remote port range type, Security parameter index type, Type of service/Traffic class type and Flow label type. It could be pre-configured in the UE to use certain parameter types when high priority uplink data is to be sent. When such parameters are used in the packets, the UE-QoS Checker may detect the high-priority situation such that no additional field is required in the message because the existing resource can be used for this purpose.

Another possible way is for the application data to indicate explicitly to UE-QoS Checker 1812 whether there is real time requirement, such that the processing cost in the UE-QoS Checker 1812 can be reduced as the indication from the application data is can be used without further evaluation for the decision. Another possible way is for the UE-QoS Checker 1812 to inspect packets for application protocol types such as RTP or SCTP or other streaming applications, such that neither additional interface nor message filed in the application data is required and existing applications can be utilized as it is.

If after these checks, there is real time requirement the UE 1810 sends a status message with real time indication shown in Step 1836. The expected response to this message in current existing systems is that the Network Node 20 in the Network 240 will setup all bearers for corresponding bearer contexts. However, if the data has no real time requirements, the UE 1810 sends a status message with non-real time indication as shown in Step 1837. Optionally, the UE could also send uplink data status message when there is no real-time requirement.

Figure 24:
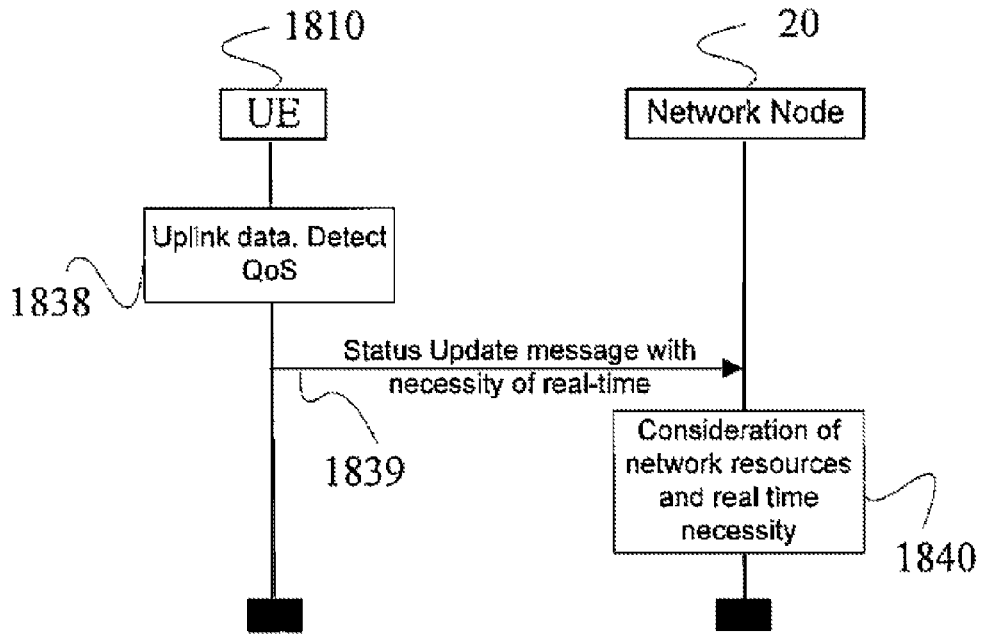
FIG. 24 is a diagram illustrating the interaction of the UE with the network for setup of a signaling connection.

FIG. 24 is a diagram illustrating the interaction of the UE with the network for setup of a signaling connection. In step 1838, the UE 1810 detects uplink data pending and the QoS of the data. After this, it sends the relevant Status Update message with the indication of necessity of real time as shown in step 1839. In step 1840, the Network Node 20 in the Network 240 evaluates the request taking at least two things into consideration: the current resources available in the network and the need for real-time or urgent communications by the UE 1810.

Figure 25:
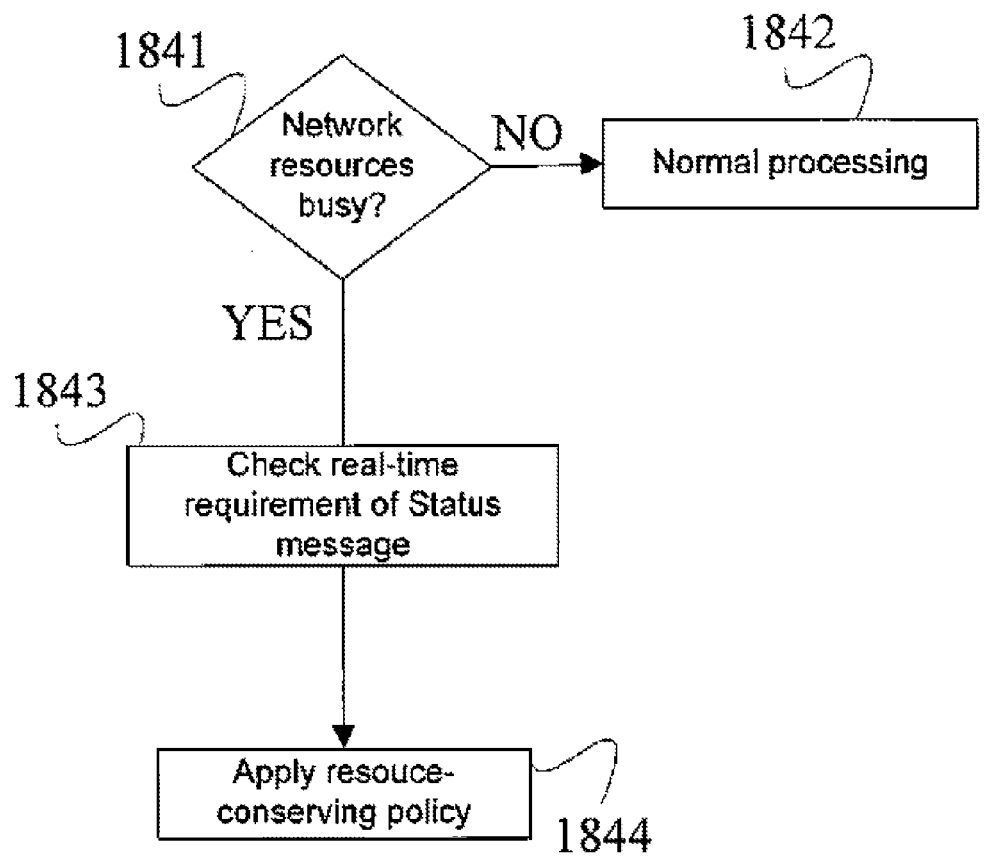
FIG. 25 is a diagram illustrating the preferred method of signaling connection setup by the Network.

FIG. 25 is a diagram illustrating the preferred method of signaling connection setup by the Network Node 20 in the Network 240. First, the Network Node 20 in the Network 240 evaluates whether the network is able to provide resources for the request as shown in step 1841. The Network Node 20 in the Network 240 may consider the resources of various network modules. Non-limiting examples are: in 3GPP the MME or SGSN may consider the resources available in the MME, S-GW, P-GW or the APN (PDN) itself.

The MME may be aware of the resources either by asking them after receiving each service request or receiving regular updates of their load. If the Network Node 20 in the Network 240 detects that there are enough resources for the specific Status Update message, the Network Node 20 in the Network 240 proceeds as normal, that is if every other requirement is met (such as security, subscription, etc), the requested bearers are established and this is considered normal processing as shown in Step 1842.

If the Network Node 20 in the Network 240 detects that there are not enough resources for the specific Status Update message, the Network Node 20 in the Network 240 checks whether the message from the UE 1810 has any indication that the message has real time or urgent requirements as shown in step 1843. Now, the Network Node 20 in the Network 240 may take several kinds of decisions based on factors such as type of resource limitation and operator policy as shown in Step 1844.

For example, if the resource limitation is in providing enough GBR bearers, the Network Node 20 in the Network 240 may establish only a subset of the bearers requested (e.g. setup non-GBR bearers) possibly using the uplink data status message if present. If the resource limitation is due to heavy signaling load and the UE 1810 has not indicated real-time requirement, the Network Node 20 in the Network 240 may reject the request and possibly ask (indicate) the UE 1810 to try again after a random amount of time. If the resource limitation is due to heavy signaling and the UE 1810 has indicated real-time requirement, the Network Node 20 in the Network 240 may allow the request and probably charge higher for such requests.

Each functional block used in the description of the embodiments as given above can be realized as LSI, typically represented by the integrated circuit. These may be produced as one chip individually or may be designed as one chip to include a part or all. Here, it is referred as LSI, while it may be called IC, system LSI, super LSI, or ultra LSI, depending on the degree of integration. Also, the technique of integrated circuit is not limited only to LSI and it may be realized as a dedicated circuit or a general-purpose processor. FPGA (Field Programmable Gate Array), which can be programmed after the manufacture of LSI, or a reconfigurable processor, in which connection or setting of circuit cell inside LSI can be reconfigured, may be used. Further, with the progress of semiconductor technique or other techniques derived from it, when the technique of circuit integration to replace LSI may emerge, the functional blocks may be integrated by using such technique. For example, the adaptation of bio-technology is one of such possibilities.

INDUSTRIAL APPLICABILITY

The invention has the advantage of reducing waste of network resources and mobile phone resources. Therefore, the invention can be advantageously used as the field of telecommunications in a packet-switched data communications network.

The invention claimed is:

1. A method for paging a mobile node in idle state comprising:
receiving, from a server by a serving gateway, a downlink data packet for the mobile node on a bearer;
sending, by the serving gateway, a Downlink Data Notification (DDN) message including bearer Identification (ID) of said bearer to a Mobility Management Entity (MME);
sending, by the MME, a Delay Downlink Packet Notification Request (DDPNR) to the serving gateway when the MME determines to limit the number of the DDN messages that the MME receives from the serving gateway; and
sending, by the serving gateway that has received the DDPNR, a new DDN message to the MME only when the serving gateway receives a new downlink data packet on a bearer having higher priority than a configured threshold priority level.

2. The method for paging the mobile node according to claim 1, wherein the DDPNR comprises delay information.

3. The method for paging the mobile node according to claim 1, wherein the configured threshold priority level is indicated in the DDPNR.

4. The method for paging the mobile node according to claim 1, comprising receiving, by the serving gateway, multiple downlink data packets on multiple bearers, respectively, and sending, by the serving gateway, a single DDN message that includes multiple bearer IDs of said multiple bearers, respectively, to the MME.

5. The method for paging the mobile node according to claim 1, comprising receiving, by the serving gateway, multiple downlink data packets on multiple bearers, respectively, and sending, by the serving gateway, multiple DDN messages that respectively include multiple IDs of said multiple bearers to the MME.

6. A serving gateway that triggers a Mobility Management Entity (MME) to page a mobile node in idle state, the serving gateway comprising:
a receiver which, in operation, receives from a server a downlink data packet for the mobile node on a bearer; and
a sender which, in operation, sends a Downlink Data Notification (DDN) message including bearer Identification (ID) of said bearer to the MME;
wherein the receiver, in operation, receives a Delay Downlink Packet Notification Request (DDPNR) from the MME when the MME determines to limit the number of the DDN messages that the MME receives, and
wherein after the receiver receives the DDPNR the sender, in operation, sends a new DDN message to the MME only when the receiver receives a new downlink data packet on a bearer having higher priority than a configured threshold priority level.

7. The serving gateway according to claim 6, wherein the DDPNR comprises delay information.

8. The serving gateway according to claim 7, wherein the delay information indicates a delay period by which the serving gateway is to delay sending the DDN messages to the MME.

9. The serving gateway according to claim 6, wherein the configured threshold priority level is indicated in the DDPNR.

10. The serving gateway according to claim 6, wherein the receiver, in operation, receives multiple downlink data packets on multiple bearers, respectively, and the sender, in operation, sends a single DDN message that includes multiple bearer IDs of said multiple bearers, respectively, to the MME.

11. The serving gateway according to claim 6, wherein the receiver, in operation, receives multiple downlink data packets on multiple bearers, respectively, and the sender, in operation, sends multiple DDN messages that respectively include multiple IDs of said multiple bearers to the MME.

12. A Mobility Management Entity (MME) comprising:
a receiver which, in operation, receives a Downlink Data Notification (DDN) message including bearer Identification (ID) of a bearer from a serving gateway, which has received from a server a downlink data packet for a mobile node on said bearer;

a controller which, in operation, determines to limit the number of the DDN messages that the MME receives from the serving gateway; and a transmitter which, in operation, transmits a Delay Downlink Packet Notification Request (DDPNR) to the serving gateway when the controller determines to limit the number of the DDN messages that the MME receives, the DDPNR triggering the serving gateway to send a new DDN message to the MME only when the serving gateway receives a new downlink data packet on a bearer having higher priority than a configured threshold priority level.

13. The MME according to claim 12, wherein the DDPNR indicates the configured threshold priority level.

14. The MME according to claim 12, wherein the DDPNR comprises delay information.

15. The MME according to claim 14, wherein the delay information indicates a delay period by which the serving gateway is to delay sending the DDN messages to the MME.

16. The MME according to claim 12, wherein the receiver, in operation, receives a single DDN message that includes multiple IDs of multiple bearers, respectively, from the serving gateway when the serving gateway receives multiple downlink data packets on said multiple bearers, respectively.

17. The MME according to claim 12, wherein the receiver, in operation, receives multiple DDN messages that respectively include multiple IDs of multiple bearers from the serving gateway when the serving gateway receives multiple downlink data packets on said multiple bearers, respectively.

* * * * *